(12) United States Patent
Werner et al.

(10) Patent No.: US 9,615,503 B2
(45) Date of Patent: Apr. 11, 2017

(54) METHOD FOR CULTIVATING SUGAR CANE

(71) Applicants: Frank Werner, Sao Paulo (BR); Nilton Degaspari, Piracicaba (BR); Antonio Cesar Azenha, Ribeirao Preto (BR); Cassio da Silva Cardoso Teixeira, Sao Paulo (BR); Paulo Cesar Queiroz, Valinhos (BR); Marco Antonio Tavares-Rodrigues, Mannheim (DE)

(72) Inventors: Frank Werner, Sao Paulo (BR); Nilton Degaspari, Piracicaba (BR); Antonio Cesar Azenha, Ribeirao Preto (BR); Cassio da Silva Cardoso Teixeira, Sao Paulo (BR); Paulo Cesar Queiroz, Valinhos (BR); Marco Antonio Tavares-Rodrigues, Mannheim (DE)

(73) Assignee: BASF SE, Ludwigshafen (DE)

( * ) Notice: Subject to any disclaimer, the term of this patent is extended or adjusted under 35 U.S.C. 154(b) by 154 days.

(21) Appl. No.: 14/346,100

(22) PCT Filed: Sep. 21, 2012

(86) PCT No.: PCT/EP2012/068625
§ 371 (c)(1),
(2) Date: Mar. 20, 2014

(87) PCT Pub. No.: WO2013/041665
PCT Pub. Date: Mar. 28, 2013

(65) Prior Publication Data
US 2014/0283443 A1    Sep. 25, 2014

Related U.S. Application Data

(60) Provisional application No. 61/538,138, filed on Sep. 23, 2011.

(30) Foreign Application Priority Data

Sep. 23, 2011    (EP) .................................. 11182454

(51) Int. Cl.
| | | |
|---|---|---|
| A01C 1/00 | (2006.01) |
| A01C 1/06 | (2006.01) |
| A01C 11/00 | (2006.01) |
| A01C 21/00 | (2006.01) |

(52) U.S. Cl.
CPC ................ *A01C 1/06* (2013.01); *A01C 11/00* (2013.01); *A01C 21/00* (2013.01)

(58) Field of Classification Search
CPC . A01G 7/00; A01G 1/001; A01G 47/00; A01C 1/00; A01C 1/06; A01N 47/24; A01N 43/56; A01N 25/00; A01N 25/32
USPC ........... 47/58.1 R, 58.1 SE, 58.1 FV, DIG. 9, 47/DIG. 3, 17; 504/100
See application file for complete search history.

(56) References Cited

U.S. PATENT DOCUMENTS

| | | | |
|---|---|---|---|
| 122,936 | A | 1/1872 | Darby |
| 2,204,214 | A | 10/1937 | Grace |
| 2,270,046 | A | 11/1939 | Grace |
| 4,043,077 | A | 8/1977 | Stonehocker |
| 4,091,569 | A | 5/1978 | Da Silva |
| 5,981,554 | A | 11/1999 | Bull et al. |
| 6,482,425 | B1 | 11/2002 | Huet et al. |
| 2008/0261811 | A1 | 10/2008 | Krohn et al. |
| 2008/0274882 | A1 | 11/2008 | Krohn et al. |
| 2010/0180498 | A1 | 7/2010 | Tachikawa et al. |
| 2015/0150162 | A1 | 5/2015 | Carver et al. |

FOREIGN PATENT DOCUMENTS

| | | |
|---|---|---|
| CH | 702011 | 4/2011 |
| CN | 1265268 | 9/2000 |
| CN | 101133738 | 3/2008 |
| CO | 13-002658 | 5/2013 |
| CO | 13-243544 | 11/2013 |
| EP | 0 295 117 | 12/1988 |
| EP | 0 882 746 | 10/1996 |
| EP | 1 066 854 | 1/2001 |
| EP | 2 005 812 | 12/2008 |
| GB | 926856 | 5/1963 |
| JP | 08280244 | 10/1996 |
| JP | 10 324605 | 12/1998 |
| JP | 2000 135025 | 5/2000 |
| JP | 2003 204716 | 7/2003 |

(Continued)

OTHER PUBLICATIONS

Bartlett et al., "The strobilurin fungicides", Pest Management Science, 2002, vol. 58, No. 7, pp. 649-662.

Grossmann et al., "Bioregulatory Effects of the Fungicidal Strobilurin Kresoxim-methyl in Wheat (*Triticum aestivum*)", Pesticide Science, 1997, vol. 50, No. 1, pp. 11-20.

Jabs et al., "Anti-oxidative and anti-senescence effects of the strobilurin pyraclostrobin in plants: A new strategy to cope with environmental stress in cereals", The BCPC Conference—Pests & Diseases, 2002, pp. 941-946.

(Continued)

*Primary Examiner* — Trinh Nguyen
(74) *Attorney, Agent, or Firm* — Brinks Gilson & Lione

(57) ABSTRACT

The present invention relates to a method for cultivating sugar cane comprising removing buds together with meristematic tissue from the stalk of a 6 to 18 months old sugar cane plant, treating the buds with at least one fungicide and/or at least one insecticide and/or at least one nematicide and/or at least one growth regulator and/or at least one rooting enabler and/or growth-promoting bacteria, planting these buds in a growth medium, growing seedlings from the buds at a temperature of at least 15° C., and 10 to 120 days after planting the buds, planting the seedlings grown from the buds to the field if the growth medium is not a field, or, in case the growth medium is a field, exposing the seedlings obtained from the buds to ambient conditions.

31 Claims, No Drawings

(56) References Cited

FOREIGN PATENT DOCUMENTS

| | | |
|---|---|---|
| WO | WO 86/06576 | 11/1986 |
| WO | WO 91/14356 | 10/1991 |
| WO | WO 98/11780 | 3/1998 |
| WO | WO 02/32211 | 4/2002 |
| WO | WO 02/076178 | 10/2002 |
| WO | WO 2008/043471 | 4/2008 |
| WO | WO 2008/059053 | 5/2008 |
| WO | WO 2008/059054 | 5/2008 |
| WO | WO 2008/095913 | 8/2008 |
| WO | WO 2009/000398 | 12/2008 |
| WO | WO 2009/000399 | 12/2008 |
| WO | WO 2009/000400 | 12/2008 |
| WO | WO 2009/000401 | 12/2008 |
| WO | WO 2009/000402 | 12/2008 |
| WO | WO 2009/024546 | 2/2009 |
| WO | WO 2009/100916 | 8/2009 |
| WO | WO 2009/100917 | 8/2009 |
| WO | WO 2011/154419 | 12/2011 |
| WO | WO 2011/161071 | 12/2011 |
| WO | WO 2012/140177 | 10/2012 |
| WO | WO 2013/041665 | 3/2013 |
| WO | WO 2013/160241 | 10/2013 |
| WO | WO 2013/160242 | 10/2013 |

OTHER PUBLICATIONS

Nason et al., "Strobilurin fungicides induce changes in photosynthetic gas exchange that do not improve water use efficiency of plants grown under conditions of water stress", Pest Management Science, 2007, vol. 63, pp. 1191-1200.

Nitzan et al., "Effect of Seed-Tuber Generation, Soilborne Inoculum, and Azoxystrobin Application on Development of Potato Black Dot Caused by *Colletotrichum coccodes*", Plant Disease, Nov. 2005, pp. 1181-1185.

Sugar Cane: technical aspects about forty-five agricultural crops in Costa Rica; General Directorate of Agricultural Research and Extension, Ministry of Agriculture and Livestock, San Jose, Costa Rica.

Venancio et al., "Physiological Effects of Strobilurin Fungicides on Plants", Publ. UEPG Exact Soil Sci. Agr. Sci. Eng., Ponta Grossa, 2003, vol. 9, No. 3, pp. 59-68.

Office Action dated Aug. 7, 2014 from U.S. Appl. No. 13/805,546.

Final Office Action dated Jan. 13, 2015 from U.S. Appl. No. 13/805,546.

Office Action dated Aug. 22, 2014 from U.S. Appl. No. 13/702,369.

International Preliminary Report on Patentability dated Jan. 15, 2014, prepared in International Application No. PCT/EP2012/068625.

International Search Report dated Dec. 20, 2012, prepared in International Application No. PCT/EP2012/068625.

Ayalde, "Caña de Azúcar," Instituto Colombiano Agropecuario Ica, Agriculture Ministry, Investigation Divition, Agronomy Department, Sugar Can National Program, Colombia, Palmira.

Leomad et al., "El Cultivo de la Caña Panelera en Zona Cafetera," Corpoica, Asopanela, Informative Bulletin, Colombia, Manizales, (1996), pp. 10-11.

Office Action dated May 11, 2015 from U.S. Appl. No. 13/805,546.

Office Action dated Aug. 5, 2015 from U.S. Appl. No. 14/111,278.

Ramaiah et al., "Elimination of Internodes in Sugarcane Seed Piece," Proceedings of the International Society for Sugarcane Technologists, (1977), pp. 1509-1513.

Rodríguez, "El Cultivo de la Caña y Recomendaciones de Manejo para Suelos de Tierra Firme del Guaviare," Technical Bulletin No. 29, Corpoica Regional Eight Publication, Colombia, San José del Guaviare, (2002).

Tarazona, "Manejo Fitosanitario del Cultivo de la Caña Panelera. Medidas para la Temporada Invernal," Paper Cane Project, ICA, (2011), pp. 9-13, 23, 24.

Final Office Action, issued in co-pending U.S. Appl. No. 14/111,278, dated Nov. 21, 2016.

Sugar Cane, http://learning.uonbi.ac.ke/courses/SBT204/scormPackages/path_2/64_primary_growth_of_the stem.html.

METHOD FOR CULTIVATING SUGAR CANE

This application is a National Stage application of International Application No. PCT/EP2012/068625, filed Sep. 21, 2012, which claims the benefit of U.S. Provisional Application No. 61/538,138 filed Sep. 23, 2011, the entire contents of which are hereby incorporated herein by reference. This application also claims priority under 35 U.S.C. §119 to European Patent Application No. 11182454.6, filed Sep. 23, 2011, the entire contents of which is hereby incorporated herein by reference.

The present invention relates to a method for cultivating sugar cane comprising removing buds together with meristematic tissue from the stalk of a 6 to 18 months old sugar cane plant, treating the buds with at least one fungicide and/or at least one insecticide and/or at least one nematicide and/or at least one growth regulator and/or at least one rooting enabler and/or growth-promoting bacteria, planting these buds in a growth medium, growing seedlings from the buds at a temperature of at least 15° C., and 10 to 120 days after planting the buds, planting the seedlings grown from the buds to the field if the growth medium is not a field, or, in case the growth medium is a field, exposing the seedlings obtained from the buds to ambient conditions.

Taking into account the finiteness of fossil fuel supply, biofuels have been rediscovered as an important energy source. Sugar cane is one of the plants which are yet used for the production of biofuels (bioethanol) and is promising for further development, as the alcohol obtained by the fermentation of these plants provides a renewable and clean fuel. The plantation area of sugar cane is increasing worldwide as well as the investments in factories to produce alcohol therefrom.

The seed of sugar cane is a dry one-seeded fruit or caryopsis formed from a single carpel, the ovary wall (pericarp) being united with the seed-coat (testa). The seeds are ovate, yellowish brown and very small, about 1 mm long. Disadvantageously, the seed of sugar cane only germinates under specific environmental characteristics, such as a constant warm and humid climate conditions. Such climatic conditions are not found everywhere sugar cane is grown, and therefore germination of sugar cane seed is not always guaranteed. For commercial agriculture, the seed of a sugar cane is not sown or planted, but instead, the cane is propagated vegetatively by planting a stem segment (or part of a stalk or culm or seedling). As mentioned above, the stem of sugar cane, as well as the stem of graminaceous plants, comprises several nodes, from which new plants grow. The traditional planting process of sugar cane involves the reservation of an area of the crop to be used as a source of plants for replanting, since the nodes are comprised in the stem. The plants used for replanting are harvested and then cut in segments of approximately 20 to 50 cm, so that at least 2 nodes are present in each stem segment (sett). Cutting the stems is needed to break apical dominance that otherwise causes poor germination when using full length (uncut) stems. The segments are cut to have at least 2 buds (or at least two nodes; every node gives generally rise to one single bud) to assure germination, because not every bud germinates. Current machines used to cut sugar cane segments are not able to identify any characteristic in the stem, and therefore the precise position of the cut sites is determined at random. After cutting, the setts are disposed horizontally, over one another in furrows of the ploughed soil, which are generally wide at ground level and deep (40 to 50 cm wide and 30 to 40 cm deep), and then lightly covered with soil.

Although this plantation technique is still being used until today, the whole process is relatively inefficient because many segments of 2 to 4 nodes have to be used to guarantee the germination. The consequence is that a large area for re-planting needs to be used, and therefore area that could be employed for the crop and production of alcohol or sugar has to be reserved for re-planting. Thus, there is a necessity to increase the efficiency of the planting technique of sugar cane.

In a more recent cultivation method from Syngenta (called Plene®), nodes of less than 4 cm in length are separated from the stems, treated with Syngenta seed products and then planted to the field. The method is said to lead to a yield increase of up to 15%. However, the area required for multiplication is still very large. Similar cultivation methods are also described in WO 2009/000398, WO 2009/000399, WO 2009/000400, WO 2009/000401 and WO 2009/000402. The Syngenta method as well as the method described in said WO references uses whole nodes, i.e. stem segments containing one or more entire nodes obtained by cutting the stem approximately vertically (relative to the longitudinal axis of the stem) into cylindrical pieces.

U.S. Pat. No. 4,091,569 relates to a process for obtaining sound sugar cane gemmas for controlling the blight of sugar cane stumps left after cutting, comprising cutting transverse disc-shaped sections from the stalk containing gemmas, subjecting them to a heat treatment and then to a Benlate (benomyl) treatment, planting the treated gemmas into pre-germination beds and transplanting the scions grown therefrom to the field when they are about 30 cm high. This method is however not yet satisfactory as the Benlate treatment might help avoiding blight, but has no further beneficial effects.

It was an object of the present invention to provide a method for cultivating sugar cane which requires a distinctly smaller area for multiplication, which makes use of the multiplication area for a shorter time, makes multiplication less dependent on the cultivation area, increases the germination and survival rate of the seedlings and yields healthy and resistant plants. Especially, the method should yield plants with more and/or stronger tillers.

The object is achieved by a method for cultivating sugar cane, which method comprises (i) removing buds together with meristematic tissue (in particular with a part of the node to which the buds are attached) from the stalk of a 6 to 18 months old sugar cane plant;

(ii) optionally subjecting the buds to a sterilization treatment;

(iii) treating the buds with at least one strobilurin fungicide and/or at least one carboxamide fungicide and/or at least one GABA antagonist insecticide and/or at least one nicotinic receptor agonist/antagonist insecticide and/or at least one chloride channel activator insecticide and optionally also with at least one fungicide different therefrom and/or at least one insecticide different therefrom and/or at least one nematicide and/or at least one growth regulator and/or at least one rooting enabler and/or growth-promoting bacteria (in other words: treating the buds with at least one active agent selected from strobilurin fungicides, carboxamide fungicides, GABA antagonist insecticides, nicotinic receptor agonist/antagonist insecticides, chloride channel activator insecticides and mixtures thereof, and optionally also with at least one agent selected from fungicides different therefrom, insecticides different therefrom, nematicides, growth regulators, rooting enablers, growth-promoting bacteria and mixtures thereof);

(iv) optionally refrigerating the buds; where the sequence of steps (ii), (iii) and (iv) is interchangeable;

(v) planting the buds obtained in step (ii), (iii) or (iv) in a growth medium;

(vi) optionally treating the growth medium before, during or shortly after planting with at least one fertilizer and/or at least one fungicide and/or at least one insecticide and/or at least one nematicide and/or at least one growth regulator and/or at least one superabsorber and/or growth-promoting bacteria;

(vii) growing seedlings from the buds at a temperature of at least 15° C. (preferably at least 18° C.);

(viii) optionally treating the seedlings, while growing, and/or their growth medium with at least one fungicide and/or at least one insecticide and/or at least one nematicide and/or at least one growth regulator and/or at least one rooting enabler and/or growth-promoting bacteria;

(ix) 10 to 120 days after planting the buds in the growth medium, if the growth medium is not a field, planting the seedlings obtained from the buds to the field, where the field has optionally been treated with at least one fertilizer and/or at least one fungicide and/or at least one insecticide and/or at least one nematicide and/or at least one growth regulator and/or at least one superabsorber and/or growth-promoting bacteria before or during planting, or, in case the growth medium is a field, exposing the seedlings obtained from the buds to ambient conditions; and (x) optionally treating the seedlings and/or the field during or after planting in the field or after exposing to ambient conditions with at least one fertilizer and/or at least one fungicide and/or at least one insecticide and/or at least one nematicide and/or at least one growth regulator and/or at least one superabsorber and/or growth-promoting bacteria and/or at least one freshness-preservation polymer.

In the terms of the present invention, "stem" is the caulis or stalk of the culm part of a graminaceus plant (here: the sugar cane plant), i.e. the main trunk of a plant, specifically a primary plant axis that develops buds and shoots.

"Sett" is a stem segment, section or cutting having one or more nodes.

"Node" is the location in the stem where the shoot, bud or gemma is formed in a graminaceus plant (here: the sugar cane plant).

"Bud" or "gemma" is the embryo, spore or germ of a plant (here: the sugar cane plant). It can also be defined as an undeveloped or embryonic shoot. A bud/gemma can be considered as the pre-stage of a shoot from which the latter develops when the bud leaves its dormant stage.

A "removed bud" in the context of the present invention refers to a bud which also contains meristematic tissue. For example, this term includes a bud plus a small section of the node to which it is attached. This term does however not encompass the whole node (with bud). Typically, the removed bud is a "bud chip", i.e. an essentially round or oval disc-shaped cutting of the stem containing the bud and some meristematic tissue; typically of a diameter of ca. 1 to 5 cm. Diameter in the context of an oval shape refers to the longest extension of the oval. In the present invention, the term "bud" used in the description of the steps succeeding step (i) denotes the removed bud containing meristematic tissue, for example in form of a bud chip.

"Germinate"/"germination" is the emergence of a new plant from propagation material, here from a bud.

"Seedling" is the young plant emerging/sprouting from propagation material, here from a bud. Within the terms of the present invention, the young plants are called "seedlings" starting from germination/sprouting until planting to a field (if the bud is first planted in a growth medium which is not a field) or until the young plant is exposed to ambient conditions (if the bud is directly planted to a field).

The sequence of steps (ii), (ii) and (iv) is interchangeable. This means that the order in which these steps are carried out is not necessarily step (ii) followed by step (iii) followed by step (iv), but can be any sequence. Further details are given below.

The following remarks made to preferred embodiments of the features of the method of the invention apply both alone as well as in particular in combination with each other.

Step (i) is preferably carried out when the sugar cane plant is 8 to 12 months old.

In step (i), buds are removed from a sugar cane plant. The buds can be removed from the plant as it stands, but for practical reasons it is preferred to first remove the plant from the place where it is growing before removing the buds from the stalk.

In a preferred embodiment, before or after removing the plant from the place where it is growing (but before removing the buds), the top part of the stalk is cut off, so that the below, remaining stalk still comprises about 5 to 15, preferably 8 to 15 and in particular 8 to 12 nodes. This serves especially for removing inactive buds from the stalk and/or for facilitating the handling of the stalk in the subsequent bud removal step. For practical reasons it is preferred to cut off the top part of the stalk before the sugar cane plant is removed from the place where it is growing.

"Cutting off" refers in the context of the present invention to any suitable procedure for removing the top part, such as cutting, chopping or sawing, e.g. with a knife, machete, axe, saw or any suitable machine, or by breaking off or tearing off manually the top part. The removal of the top part of the plant can be carried out manually or automatedly.

In a preferred embodiment of the invention, in step (i) the sugar cane plant is removed from the place where it is growing before the buds are removed, and before or after (preferably before) removing the sugar cane plant from the place where it is growing (and in any case before step the buds are removed), the top part of the stalk of the plant is cut off, so that the below stalk still comprises 5 to 15, preferably 8 to 15 and in particular 8 to 12 nodes. "Before" in this context means some days to a few seconds, e.g. three days to some seconds, before the plant is removed from the place where it is growing.

The plant or its "decapitated" stalk can be removed together with its subterranean part. This can be carried out by any suitable means, such as eradicating, digging out or ploughing out the root. The removal can be carried out manually or automatedly.

Subsequently, the (originally) subterranean part is preferably removed from the stalk. Removing the subterranean part from the stalk can be done by any suitable means, such as cutting or chopping it off or breaking or tearing it off mechanically, e.g. manually or by a kick.

It is, however, preferred to remove the plant or its "decapitated" stalk closely above the soil surface. Preferably, the plant/stalk is removed in such a manner that it comprises all nodes or at least 80% of the nodes present in the plant or in its "decapitated" stalk. Removing can be carried out by any suitable means, such as cutting, chopping or sawing, e.g. with a knife, machete, axe, saw or any suitable machine, or by breaking or tearing the stalk off mechanically, e.g. manually or by a kick. In a preferred embodiment, the plant/stalk is removed by breaking or tearing it off mechanically, e.g. manually or, more practically, by a kick. This has the advantage that diseases possibly present in single plants are not spread to contaminate other, healthy plants via the tools used for cutting/chopping/sawing etc., such as knifes, machetes, axes, saws and the like.

The time interval between removing the plant from the place where it is growing and removing the buds must not be too long in order to ensure that the buds are still productive. The maximum time interval can however be influenced by the storing conditions of the removed plant or its stalk. For instance, storage under humid conditions can prolong the maximum time interval. However it is preferred to remove the buds shortly after the plant has been removed from the place where it has been growing, e.g. at most 7 days, preferably at most 5 days, more preferably at most 3 days and in particular at most 2 days after the plant has been removed from the from the place where it has been growing.

It is imperative that the buds are removed in such a way that the removed buds comprise meristematic tissue. The meristematic tissue is known to those skilled in the art and can be located by its position close to the node. The presence of meristematic tissue enables the removed buds to form roots and produce seedlings. For this purpose the buds are removed close to the node from which they originate and preferably comprise (or, in other words, are attached to) a part of the node.

The removal of the buds can be carried out by any suitable means, such as punching, cutting, chopping or sawing, e.g. with a knife, machete, axe, saw or any suitable machine, or by breaking off or tearing off manually the buds.

The removal is preferably carried out by punching, e.g. with a suitable device, such as a manual or automated punching machine.

In a preferred embodiment, the stalks, before removing the buds, are cut lengthwise (longitudinally) in such a way that the buds are as centralized as possible on the resulting two halves of the stalk.

From these stalk halves, buds or stalk pieces containing the buds, e.g. disks with a diameter of about 1 to 5 cm, preferably 1 to 3 cm, more preferably 2 to 3 cm, containing the buds and a part of the node, are removed, e.g. by cutting, sawing or punching, punching being preferred. Punching can be carried out by a punching machine, such as the Sugarcane Bud Extractor from Copersucar, Brazil.

In optional step (ii) the buds obtained in step (i) or (iii) or (iv) are subjected to a sterilization treatment. This treatment is carried out for destroying harmful microorganisms, such as bacteria and viruses, which may be harmful to the bud or the plant developing therefrom, such as the microorganism causing ratoon stunting disease.

Sterilization can be carried out by any means known for destroying microorganisms. As a matter of course the sterilization treatment must not deteriorate the buds or impair their germination ability. Suitable sterilization treatments are for example heat treatment, treatment with an alcohol solution, treatment with a hypochlorite solution or γ-irradiation or a combination of these methods.

The heat treatment is preferably carried out by means of water or steam having a temperature of at least 50° C., e.g. 50 to 60° C. or 50 to 55° C., preferably of at least 51° C., e.g. 51 to 60° C. or 51 to 55° C., and especially of ca. 52° C.

For this purpose, the buds are for example immersed into water or doused or spilled or sprinkled or sprayed with water of the desired temperature or are surrounded by steam of the desired temperature (if required at reduced pressure).

The heat treatment is preferably carried out for 5 minutes to 4 hours, preferably for 10 minutes to 2 hours. The duration of the heat treatment generally depends from the applied temperature; the higher the applied temperature, the shorter being the time. For instance, if the applied temperature is ca. 50° C., application time is preferably ca. 2 h, and if the applied temperature is ca. 52° C., application time is preferably ca. 30 min.

The alcohol treatment is preferably carried out by contacting the buds with an alcohol solution, for example by immersing the buds into an alcohol solution, preferably into an aqueous ca. 70% ethanol solution, or by spilling or sprinkling or spraying the buds with such a solution.

The hypochlorite treatment is preferably carried out by contacting the buds with an aqueous hypochlorite solution, for example by immersing the buds into an aqueous hypochlorite solution, preferably into an aqueous sodium or potassium hypochlorite solution, such as Eau de Javel, in a concentration of preferably from 0.1 to 1%, more preferably from 0.1 to 0.5%.

γ-irradiation is preferably carried out by exposing the buds to a γ source.

Among the above sterilization methods preference is given to the heat treatment.

In mandatory step (iii) the buds obtained in step (i) or (ii) or (iv) are treated with at least one
strobilurin fungicide and/or at least one carboxamide fungicide and/or at least one GABA antagonist insecticide and/or at least one nicotinic receptor agonist/antagonist insecticide and/or at least one chloride channel activator insecticide, i.e. with at least one active agent selected from strobilurin fungicides, carboxamide fungicides, GABA antagonist insecticides, nicotinic receptor agonist/antagonist insecticides and chloride channel activator insecticides. They are moreover optionally also treated with at least one fungicide different therefrom and/or at least one insecticide different therefrom and/or at least one nematicide and/or at least one growth regulator and/or at least one rooting enabler and/or growth-promoting bacteria. Suitable and preferred fungicides different from strobilurins and carboxamide fungicides, insecticides different from GABA antagonists, nicotinic receptor agonists/antagonists and chloride channel activators, nematicides, growth regulators, rooting enablers and growth-promoting bacteria are described below. If treatments with at least one fungicide different from strobilurins, at least one insecticide and/or at least one nematicide are carried out depends among others on the (type and intensity of) pest pressure.

This treatment is carried out for protecting the buds from diseases and pests, but also for supporting physiological effects.

Preferably, the at least one strobilurin fungicide (i.e. the strobilurin used in step (iii), but also preferably used in the optional treatment steps) is selected from azoxystrobin, dimoxystrobin, enestroburin, fluoxastrobin, kresoxim-methyl, metominostrobin, orysastrobin, picoxystrobin, pyraclostrobin, pyraoxystrobin, pyrametostrobin, pyribencarb, trifloxystrobin, 2-(2-(6-(3-chloro-2-methyl-phenoxy)-5-fluoro-pyrimidin-4-yloxy)-phenyl)-2-methoxyimino-N-methyl-acetamide, 3-methoxy-2-(2-(N-(4-methoxy-phenyl)-cyclopropane-carboximidoylsulfanylmethyl)-phenyl)-acrylic acid methyl ester, methyl (2-chloro-5-[1-(3-methylbenzyloxyimino)ethyl]benzyl)carbamate and 2-(2-(3-(2,6-dichlorophenyl)-1-methyl-allylideneaminooxymethyl)-phenyl)-2-methoxyimino-N- methyl-acetamide. More preferred strobilurin fungicides are selected from azoxystrobin, dimoxystrobin, fluoxastrobin, fluxapyroxade, kresoxim-methyl, orysastrobin, picoxystrobin, pyraclostrobin and trifloxystrobin. Specifically, the strobilurin fungicide is pyraclostrobin.

Preferably, the at least one carboxamide fungicide [i.e. the carboxamide fungicide used in step (iii), but also preferably used in the optional treatment steps] is selected from benalaxyl, benalaxyl-M, benodanil, bixafen, boscalid, carboxin, fenfuram, fenhexamid, flutolanil, furametpyr, isopyrazam, isotianil, kiralaxyl, mepronil, metalaxyl, metalaxyl-M (mefenoxam), ofurace, oxadixyl, oxycarboxin, penthiopyrad, sedaxane, tecloftalam, thifluzamide, tiadinil, 2-amino-4-methyl-thiazole-5-carboxanilide, 2-chloro-N-(1,1,3-trimethyl-indan-4-yl)-nicotinamide, N-(3',4',5'-trifluorobiphenyl-2-yl)-3-difluoromethyl-1-methyl-1H-pyrazole-4-carboxamide (fluxapyroxad), N-(4'-trifluoromethylthiobiphenyl-2-yl)-3-difluoromethyl-1-methyl-1H-pyrazole-4-carboxamide, N-(2-(1,3-dimethyl-butyl)-phenyl)-1,3-dimethyl-5-fluoro-1H-pyrazole-4-carboxamide and N-(2-(1,3,3-trimethyl-butyl)-phenyl)-1,3-dimethyl-5-fluoro-1H-pyrazole-4-carboxamide, dimethomorph, flumorph, pyrimorph, flumetover, fluopicolide, fluopyram, zoxamide, N-(3-ethyl-3,5,5-trimethyl-cyclohexyl)-3-formylamino-2-hydroxy-benzamide, carpropamid, dicyclomet, mandiproamid, oxytetracyclin, silthiofam and N-(6-methoxy-pyridin-3-yl)cyclopropanecarboxylic acid amide. More preferably, it is selected from boscalid and fluxapyroxade and is specifically fluxapyroxade.

Preferably, the at least one GABA antagonist [i.e. the GABA antagonist insecticide used in step (iii), but also preferably used in the optional treatment steps] is selected from acetoprole, endosulfan, vaniliprole, pyrafluprole, pyriprole, the phenylpyrazole compound of the formula II

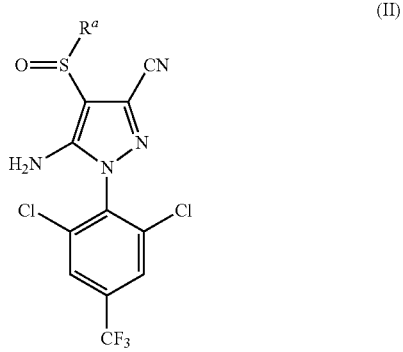

where $R^a$ is $C_1$-$C_4$-alkyl or $C_1$-$C_4$-haloalkyl;
or an agriculturally acceptable salt thereof;
and the phenylpyrazole compound of the formula III

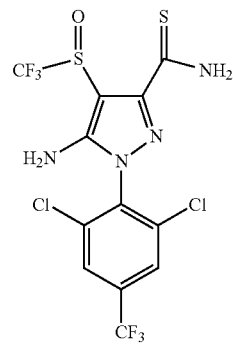

or an agriculturally acceptable salt thereof.

More preferably, the GABA antagonist insecticide is selected from fipronil.

Preferably, the at least one nicotinic receptor agonist/antagonist insecticide [i.e. the nicotinic receptor agonist/antagonist insecticide used in step (iii), but also preferably used in the optional treatment steps] is selected from acetamiprid, bensultap, cartap hydrochloride, clothianidin, dinotefuran, imidacloprid, thiamethoxam, nitenpyram, nicotine, spinosad (allosteric agonist), spinetoram (allosteric agonist), thiacloprid, thiocyclam, thiosultap-sodium and AKD1022. More preferably, the at least one nicotinic receptor agonist/antagonist insecticide is selected from acetamiprid, clothianidin, imidacloprid and thiamethoxam and is specifically thiamethoxam.

Preferably, the at least one chloride channel activator insecticide [i.e. the chloride channel activator insecticide used in step (iii), but also preferably used in the optional treatment steps] is selected from abamectin, emamectin, ivermectin, lepimectin and milbemectin. More preferably, the at least one chloride channel activator insecticide is abamectin.

In one preferred embodiment, the buds are treated in step (iii) with at least one strobilurin fungicide. Suitable and preferred strobilurin fungicides are listed above.

In an alternatively preferred embodiment, the buds are treated in step (iii) with at least one carboxamide fungicide. Suitable and preferred carboxamide fungicides are listed above.

In an alternatively preferred embodiment, the buds are treated in step (iii) with at least one GABA antagonist insecticide. Suitable and preferred GABA antagonist insecticides are listed above.

In an alternatively preferred embodiment, the buds are treated in step (iii) with al least one nicotinic receptor agonist/antagonist insecticide. Suitable and preferred nicotinic receptor agonist/antagonist insecticides are listed above.

In an alternatively preferred embodiment, the buds are treated in step (iii) with at least one chloride channel activator insecticide. Suitable and preferred chloride channel activator insecticides are listed above.

Among the fungicides and insecticides to be mandatorily used in step (iii), more preference is given to the strobilurin fungicides, carboxamide fungicides, GABA antagonist insecticides and nicotinic receptor agonist/antagonist insecticides. Suitable and preferred strobilurin fungicides, carboxamide fungicides, GABA antagonist insecticides and nicotinic receptor agonist/antagonist insecticides are listed above. Specific preference is given to pyraclostrobin, fluxapyroxade, fipronil and thiamethoxam. Even more preference is given to the strobilurin fungicides and especially to pyraclostrobin.

The treatment of step (iii) is preferably carried out by bringing the buds into contact with at least one of the above-listed active agents, preferably with a liquid medium containing the active agent(s), more preferably with a solution thereof, even more preferably an aqueous solution thereof. "Bringing into contact" can be carried out by any suitable means known for example from seed treatment, such as immersing, dousing, sprinkling, spraying, dipping, coating, dressing and the like. The choice of the technique will depend on the available means, on the active agent, but also on the desired duration and intensity of contact. For example, the treatment may be carried out by mixing the buds with the particular amount desired of active ingredient formulations either as such or after prior dilution with water in an apparatus suitable for this purpose, for example a mixing apparatus for solid or solid/liquid mixing partners, until the composition is distributed uniformly on the buds. If appropriate, this can be followed by a drying operation. However, one of the simplest and most effective techniques is immersing the buds into a solution containing one or more active agents. The suitable duration of contact depends on several factors, such as the treatment technique, the specific active agent, its concentration in solution and the health status of the buds, and can be determined by those skilled in the art for each particular case. For instance, immersing can last from a few seconds to 10 minutes, preferably from 3 seconds to 5 minutes, more preferably from 5 seconds to 1 minute. Dousing, sprinkling, spraying and dipping can be carried out to run-off point.

Especially for achieving physiological effects, it is preferred that the whole bud (including the meristematic tissue bound thereto) be brought into contact with the active agent or the medium containing the active agent. Accordingly, the above-mentioned techniques are preferably carried out in such a way that the whole bud (including the meristematic tissue bound thereto) is brought into contact with the active agent or the medium containing the active agent, be it for example by complete immersion, dousing, sprinkling or spraying on the complete surface of the bud to run-off point and the like. As immersion is the simplest and most effective technique for achieving this, the buds are preferably treated in step (iii) with the at least one active agent selected from strobilurin fungicides, carboxamide fungicides, GABA antagonist insecticides, nicotinic receptor agonist/antagonist insecticides, chloride channel activator insecticides and mixtures thereof by immersing the complete bud into a liquid medium containing said active agent.

The active agents used in step (iii) are preferably brought into contact with the buds in form of an aqueous solution. Preferably, the aqueous solution contains the active agents, especially the strobilurin fungicides, carboxamide fungicides, GABA antagonist insecticides, nicotinic receptor agonist/antagonist insecticides and/or chloride channel activator insecticides, in a concentration of from 0.001 to 10% by weight, more preferably from 0.01 to 5% by weight, even more preferably from 0.05 to 1% by weight and in particular from 0.05 to 0.5% by weight, relative to the weight of the solution. Alternatively, the aqueous solution used in step (iii) contains the active agent(s) in an amount of from 0.01 to 100 g/l of solution, more preferably from 0.1 to 50 g/l of solution, even more preferably from 0.5 to 10 g/l of solution and in particular from 0.5 to 5 g/l of solution.

In optional step (iv) the buds obtained in step (i), (ii) or (iii) are refrigerated. "Refrigerating" in this context means cooling the buds to a temperature of from 0° C. to 14° C., preferably from 3° C. to 10° C. and in particular from 5 to 8° C. This refrigerating step serves especially for storing the buds if planting or the treatment of steps (ii) and/or (iii) cannot be carried out shortly after removing them from the stalk or if they are to be transported to be stored and/or planted in a remote place. The refrigerating lasts preferably at most 1 month, more preferably at most 15 days.

The sequence of steps (ii), (ii) and (iv) is interchangeable. This means that the order in which these steps are carried out is variable. The only prerequisite is that they are carried out after step (i) and before step (v) and that step (iii) is carried out mandatorily, while steps (ii) and (iv) are optional. Suitable sequences are for example:
  only step (iii)
  step (ii) followed by step (iii)
  step (iii) followed by step (ii)
  step (iii) followed by step (iv)
  step (iv) followed by step (iii)
  step (ii) followed by step (iii) followed by step (iv)
  step (ii) followed by step (iv) followed by step (iii)
  step (iii) followed by step (ii) followed by step (iv)
  step (iv) followed by step (ii) followed by step (iii)
  step (iii) followed by step (iv) followed by step (ii)

Among these sequences preference is given to the following:
  only step (iii)
  step (iii) followed by step (iv)
  step (iv) followed by step (iii).

These buds obtained in steps (ii), (iii) or (iv) are then planted in a growth medium [step (v)].

The growth medium may be a natural or synthetic substrate or a mixture thereof. Examples are soil, clay, sand, silt, small wood chops, cellulose, decayed organic residues, vermiculite, coconut fibers and the like and mixtures thereof. Among these, preference is given to growth media poor in organic material in order to avoid the presence of soil microorganisms. Preference is thus in particular given to sand, vermiculite or coconut fibers, specifically to coconut fibers. The growth medium may also be a nutrient solution, such as an aqueous solution containing growth factors, fertilizers, buffers, ion exchangers, inorganic salts, such as calcium salts (e.g. calcium nitrate, calcium sulphate, calcium hydrogen phosphate), magnesium salts (e.g. magnesium nitrate, magnesium sulphate), potassium salts (e.g. potassium dihydrogen phosphate, potassium nitrate), iron salts (e.g. ferrous sulfate, ferric chloride) and micronutrients (e.g. lithium salts, such as lithium chloride, copper salts, such as copper sulfate, zinc salts, such as zinc sulfate, aluminium salts, such as aluminium sulfate, nickel salts, such as nickel sulfate, tin salts, such as tin chloride, cobalt salts, such as cobalt nitrate, boric acid) and mixtures thereof like Knop's nutrition solution and Hoagland's A-Z solution, and the like. The nutrient solution may be form-stabilized, e.g. by an inorganic substrate, such as expanded clay. More preferably the growth medium is however sand, vermiculite or coconut fibers, specifically coconut fibers.

In optional step (vi) the growth medium may be treated before, during and/or after planting the buds with at least one fertilizer and/or at least one fungicide and/or at least one insecticide and/or at least one nematicide and/or at least one growth regulator and/or at least one superabsorber and/or growth-promoting bacteria. Suitable and preferred fertilizers, fungicides, insecticides, nematicides, growth regulators, superabsorbers and growth-promoting bacteria are described below. Among the fungicides, especial preference is given to the treatment with fungicides which also have a physiological, especially a plant health and/or growth-promoting effect, such as the strobilurins and especially pyraclostrobin. Preferred is the treatment with at least one fungicide, in particular a strobilurin fungicide, especially pyraclostrobin, and/or at least one growth regulator.

In a preferred embodiment step (vi) is carried out. Preferably the growth medium is treated with at least one strobilurin fungicide and optionally also with at least one fungicide different therefrom and/or at least one fertilizer and/or at least one insecticide and/or at least one nematicide and/or at least one growth regulator and/or at least one superabsorber and/or growth-promoting bacteria. Suitable and preferred strobilurin fungicides are listed above and below. Specific preference is given to pyraclostrobin.

In a preferred embodiment, in step (v), the buds are planted in a container containing a growth medium. Suitable growth media are listed above. Preferred growth media to be used in a container are selected from sand, vermiculite, coconut fibers and mixtures thereof and are more preferably vermiculite or coconut fibers, specifically coconut fibers.

The container may be made of a conventional material or a biodegradable material. Biodegradable containers have the advantage that the seedling can be planted together with the container into the field, i.e. there is no need to remove the seedling from the container before planting. This in turn has the advantage that planting can be carried out using an automatic or semi-automatic planting machine.

In a specific embodiment, a biodegradable container is used in step (v). The biodegradable container is based on a biodegradable material which in turn is preferably based on biodegradable polyesters, starch, cellulose, cellulosic material, polylactic acid, caoutchouc, paper, paperboard, pulp of cellulosic origin, straw, bagasse, sawdust, natural fibres or mixtures thereof.

In an alternative specific embodiment, the container is a conventional (i.e. not specifically biodegradable) one.

After planting the buds into the growth medium and after the optional treatment of the growth medium with at least one fertilizer, at least one fungicide, at least one insecticide, at least one nematicide, at least one growth regulator, at least one superabsorber and/or growth-promoting bacteria, seedlings are grown from the buds at a temperature of at least 15° C. Preferably, seedlings are grown from the buds at a temperature of from 15 to 35° C. More preferably, seedlings are grown from the buds at a temperature of at least 18° C., even more preferably from 18 to 35° C., particularly preferably from 20 to 35° C., in particular from 22 to 35° C. and especially from 25 to 35° C., e.g. 25 to 32° C. or 25 to 30° C. or 25 to 28° C. or 25 to 27° C.

Preferably, seedlings are grown from the buds at a humidity of from 40 to 100%, more preferably from 50 to 95%, even more preferably from 70 to 90% and in particular from 70 to 80%.

The required temperature is realized either naturally, for instance if the seedlings are grown from the buds in a warm climate, e.g. in a tropical climate, or by the aid of artificial means. Artificial means are for example greenhouses or covering materials. The growing medium may for example be in a greenhouse or be transferred thereto after planting, or the growing medium containing the bud may be thermally insulated, e.g. by covering with a suitable material, such as a foil.

In one preferred embodiment, the buds are planted into a container containing a growth medium, where the container is in a greenhouse or is placed into a greenhouse after planting.

In the greenhouse, the temperature is preferably in the range of from 15 to 35° C., more preferably from 18 to 35° C., even more preferably from 20 to 35° C., in particular from 22 to 35° C. and especially from 25 to 35° C., e.g. 25 to 32° C. or 25 to 30° C. or 25 to 28° C. or 25 to 27° C. Humidity is preferably in the range of from 40 to 100%, more preferably from 50 to 95%, even more preferably from 70 to 90% and in particular 70 to 80%.

In an alternative embodiment, the buds are planted into a container containing a growth medium or into a field (in this case the growth medium is the soil of the field) and the container or the field is covered with one or more covering materials.

Covering materials are for example textile mats and cover foils customarily used for thermal insulation/protection in agriculture, such as agriculture plastic foil, preferably black foil, for example in the form of foil tunnels, or fleece mats.

It is however more preferred to plant the buds into a container containing a growth medium, where the container is in a greenhouse or is placed into a greenhouse after planting.

In optional step (viii) the seedlings, while growing at a temperature of at least 15° C., and/or their growth medium are treated once or several times, e.g. 1, 2 or 3 times, preferably once or twice, with at least one fungicide and/or at least one insecticide and/or at least one nematicide and/or at least one growth regulator and/or at least one rooting enabler and/or growth-promoting bacteria. Suitable and preferred fungicides, insecticides, nematicides, growth regulators, rooting enablers and growth-promoting bacteria are described above and below. Treating the seedling means in this context that either the seedling, when emerged from the growth medium, or the growth medium or both are treated. If treatments with at least one fungicide, at least one insecticide and/or at least one nematicide are carried out depends among others on the (type and intensity of) pest pressure.

In a preferred embodiment, step (viii) is carried out, i.e. it is preferably not optional, but mandatory.

Preferably the seedlings, while growing, and/or their growth medium are treated with at least one strobilurin fungicide and/or at least one carboxamide fungicide and/or at least one GABA antagonist insecticide and/or at least one nicotinic receptor agonist/antagonist insecticide and/or at least one chloride channel activator insecticide and optionally also with at least one nematicide and/or at least one growth regulator and/or at least one rooting enabler and/or growth-promoting bacteria. Suitable and preferred nematicides, growth regulators, rooting enablers and growth-promoting bacteria are described above and below.

In one preferred embodiment, the seedlings, while growing, and/or their growth medium are treated with at least one strobilurin fungicide.

In an alternatively preferred embodiment, the seedlings, while growing, and/or their growth medium are treated with at least one carboxamide fungicide.

In an alternatively preferred embodiment, the seedlings, while growing, and/or their growth medium are treated with at least one GABA antagonist insecticide.

In an alternatively preferred embodiment, the seedlings, while growing, and/or their growth medium are treated with at least one nicotinic receptor agonist/antagonist insecticide.

In an alternatively preferred embodiment, the seedlings, while growing, and/or their growth medium are treated with at least one chloride channel activator insecticide.

In an alternatively preferred embodiment, the seedlings, while growing, and/or their growth medium are treated with at least one strobilurin fungicide and at least one GABA antagonist insecticide.

Suitable and preferred strobilurin fungicides, carboxamide fungicides, GABA antagonist insecticides, nicotinic receptor agonist/antagonist insecticides and chloride channel activator insecticides correspond to those listed above for step (iii).

10 to 120, preferably 20 to 100 days after having planted the bud in the growth medium, the seedling which has grown from the bud is planted to the field (of course only if the growth medium is not yet a field). At this point of time, the seedling has generally a length of from 20 to 80 cm. Planting to the field is more preferably carried out 20 to 80 days, even more preferably 25 to 70 days, in particular 25 to 60 days and specifically 30±5 days after having planted the bud in the growth medium.

In a preferred embodiment, the seedlings, before being planted to the field are allowed to acclimatize, i.e. they are allowed to adapt to conditions as they are present in the field. For this purpose they can for example be brought into an area with weather conditions similar or identical to the conditions in the field, i.e. with changes in temperature, humidity, rain, drought etc, or the roof of the glass house can be partially or completely removed. This acclimatization is generally carried out 1 day to 1 month, preferably 1 day to 3 weeks, more preferably 10 to 20 days before planting to the field.

The field has optionally been treated with at least one fertilizer and/or at least one fungicide and/or at least one insecticide and/or at least one nematicide and/or at least one growth regulator and/or at least one superabsorber and/or growth-promoting bacteria before planting. These treatments can also be carried out during planting, for instance in the form of an in-furrow application. Suitable and preferred fertilizers, fungicides, insecticides, nematicides, growth regulators, superabsorbers and growth-promoting bacteria are described below.

Planting into the field may take place manually, semi-automatically or automatedly. Planting can for example take place totally automatedly if biodegradable containers are used for planting the buds and growing the seedlings therein. In this case, the seedlings needn't be taken out of the containers before planting, which allows the use of a planting machine for the whole process of planting. In case a conventional container is used, the seedlings have to be taken out the container before planting, which is generally carried out manually. Planting can then take place automatedly.

Preferably, planting to the field is carried out automatedly (mechanical planting), i.e. using a planting machine. Mechanical planting with a semiautomatic or automatic planting machine allows a very regular planting, e.g. very linear (in one line with only small deviations from linearity) and also essentially equidistant (equidistance between the planted seedlings). Semiautomatic or automatic planting machines moreover plant the seedlings with the correct orientation, i.e. with the aerial parts upturned and the roots downturned. This leads to a more regular, linear tillering of the plants. Linearity of the planted rows, equidistance of the plants and/or regular/linear tillering in turn ease harvesting of the sugar cane plants grown from the mechanically planted seedlings, especially harvesting with a harvesting machine, and thus eventually enhance the yield because less stalks remain uncut or maimed due to their deviation from linearity or equidistance or erratic tillering. Especially maimed stalks may damage the plant or its roots and be a source for diseases.

If the field is the growth medium, 10 to 120, preferably 20 to 100, more preferably 20 to 80 days, even more preferably 25 to 70 days, in particular 25 to 60 days and specifically 30±5 days after having planted the bud, the seedling grown therefrom is exposed to ambient conditions, i.e. is no longer protected thermally. For instance, if the thermal protection has been realized by means of a covering material, such as a cover foil or a fleece mat, this is removed.

Before, during or shortly after planting to the field or shortly after exposing to ambient conditions the seedlings are optionally pruned.

During or after planting in the field or after exposing to ambient conditions, the seedling or the field may be treated with at least one fertilizer and/or at least one fungicide and/or at least one insecticide and/or at least one nematicide and/or at least one growth regulator and/or at least one superabsorber and/or growth-promoting bacteria and/or at least one freshness-preservation polymer. Suitable and preferred fertilizers, fungicides, insecticides, nematicides, growth regulators, superabsorbers, growth-promoting bacteria and freshness-preservation polymers are described below.

In the above treatments, if not specified otherwise [like in case of step (iii)], the at least one fungicide [to be more precise, the at least one fungicide optionally used in step (iii), (vi), (viii), (ix) and/or (x)] is preferably selected from
A) azoles, selected from the group consisting of
    azaconazole, bitertanol, bromuconazole, cyproconazole, difenoconazole, diniconazole, diniconazole-M, epoxiconazole, etaconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole, 1-(4-chloro-phenyl)-2-([1,2,4]triazol-1-yl)-cycloheptanol, cyazofamid, imazalil, pefurazoate, prochloraz, triflumizol, benomyl, carbendazim, fuberidazole, thiabendazole, ethaboxam, etridiazole, hymexazole and 2-(4-chloro-phenyl)-N-[4-(3,4-dimethoxy-phenyl)-isoxazol-5-yl]-2-prop-2-ynyloxy-acetamide;
B) strobilurins, selected from the group consisting of
    azoxystrobin, dimoxystrobin, enestroburin, fluoxastrobin, kresoxim-methyl, metominostrobin, orysastrobin, picoxystrobin, pyraclostrobin, pyraoxystrobin, pyrametostrobin, pyribencarb, trifloxystrobin, 2-(2-(6-(3-chloro-2-methyl-phenoxy)-5-fluoro-pyrimidin-4-yloxy)-phenyl)-2-methoxyimino-N-methyl-acetamide, 3-methoxy-2-(2-(N-(4-methoxy-phenyl)-cyclopropane-carboximidoyl-sulfanylmethyl)-phenyl)-acrylic acid methyl ester, methyl (2-chloro-5-[1-(3-methylbenzyloxyimino)ethyl]benzyl)carbamate and 2-(2-(3-(2,6-dichlorophenyl)-1-methyl-allylideneaminooxymethyl)-phenyl)-2-methoxyimino-N-methyl-acetamide;
C) carboxamides, selected from the group consisting of
    benalaxyl, benalaxyl-M, benodanil, bixafen, boscalid, carboxin, fenfuram, fenhexamid, flutolanil, furametpyr, isopyrazam, isotianil, kiralaxyl, mepronil, metalaxyl, metalaxyl-M (mefenoxam), ofurace, oxadixyl, oxycarboxin, penthiopyrad, sedaxane, tecloftalam, thifluzamide, tiadinil, 2-amino-4-methyl-thiazole-5-carboxanilide, 2-chloro-N-(1,1,3-trimethyl-indan-4-yl)-nicotinamide, N-(3',4',5'-trifluorobiphenyl-2-yl)-3- difluoromethyl-1-methyl-1H-pyrazole-4-carboxamide (fluxapyroxade), N-(4'-trifluoromethylthiobiphenyl-2-yl)-3-difluoromethyl-1-methyl-1H-pyrazole-4-carboxamide, N-(2-(1,3-dimethyl-butyl)-phenyl)-1,3-dimethyl-5-fluoro-1H-pyrazole-4-carboxamide and N-(2-(1,3,3-trimethyl-butyl)-phenyl)-1,3-dimethyl-5-fluoro-1H-pyrazole-4-carboxamide, dimethomorph, flumorph, pyrimorph, flumetover, fluopicolide, fluopyram, zoxamide, N-(3-ethyl-3,5,5-trimethyl-cyclohexyl)-3-formylamino-2-hydroxy-benzamide, carpropamid, dicyclomet, mandiproamid, oxytetracyclin, silthiofam and N-(6-methoxy-pyridin-3-yl)cyclopropanecarboxylic acid amide;

D) heterocyclic compounds, selected from the group consisting of fluazinam, pyrifenox, 3-[5-(4-chloro-phenyl)-2,3-dimethyl-isoxazolidin-3-yl]pyridine, 3-[5-(4-methyl-phenyl)-2,3-dimethyl-isoxazolidin-3-yl]-pyridine, 2,3,5,6-tetra-chloro-4-methanesulfonyl-pyridine, 3,4,5-trichloropyridine-2,6-di-carbonitrile, N-(1-(5-bromo-3-chloro-pyridin-2-yl)-ethyl)-2,4-dichloronicotinamide, N-[(5-bromo-3-chloro-pyridin-2-yl)-methyl]-2,4-dichloro-nicotinamide, bupirimate, cyprodinil, diflumetorim, fenarimol, ferimzone, mepanipyrim, nitrapyrin, nuarimol, pyrimethanil, triforine, fenpiclonil, fludioxonil, aldimorph, dodemorph, dodemorph-acetate, fenpropimorph, tridemorph, fenpropidin, fluoroimid, iprodione, chlozolinate, procymidone, vinclozolin, famoxadone, fenamidone, flutianil, octhilinone, probenazole, 5-amino-2-isopropyl-3-oxo-4-ortho-tolyl-2,3-dihydro-pyrazole-1-carbothioic acid S-allyl ester, acibenzolar-5-methyl, amisulbrom, anilazin, blasticidin-S, captafol, captan, chinomethionat, dazomet, debacarb, diclomezine, difenzoquat, difenzoquat-methylsulfate, fenoxanil, Folpet, oxolinic acid, piperalin, proquinazid, pyroquilon, quinoxyfen, triazoxide, tricyclazole, 2-butoxy-6-iodo-3-propylchromen-4-one, 5-chloro-1-(4,6-dimethoxy-pyrimidin-2-yl)-2-methyl-1H-benzoimidazole, 5-chloro-7-(4-methylpiperidin-1-yl)-6-(2,4,6-trifluorophenyl)-[1,2,4]triazolo[1,5-a]pyrimidine and 5-ethyl-6-octyl-[1,2,4]triazolo[1,5-a]pyrimidine-7-ylamine;

E) carbamates, selected from the group consisting of ferbam, mancozeb, maneb, metam, methasulphocarb, metiram, propineb, thiram, zineb, ziram, benthiavalicarb, pyributicarb, diethofencarb, iprovalicarb, iodocarb, propamocarb, propamocarb hydrochlorid, prothiocarb, valiphenal and N-(1-(1-(4-cyano-phenyl)ethanesulfonyl)-but-2-yl)carbamic acid-(4-fluorophenyl)ester;

F) other active compounds, selected from the group consisting of guanidines: guanidine, dodine, dodine free base, guazatine, guazatine-acetate, iminoctadine, iminoctadine-triacetate, iminoctadine-tris(albesilate);

antibiotics: kasugamycin, kasugamycin hydrochloride-hydrate, streptomycin, polyoxine, validamycin A;

nitrophenyl derivates: binapacryl, dinobuton, dinocap, meptyldinocap, nitrthal-isopropyl, tecnazen, organometal compounds: fentin salts, such as fentin-acetate, fentin chloride or fentin hydroxide;

sulfur-containing heterocyclyl compounds: dithianon, isoprothiolane;

organophosphorus compounds: edifenphos, fosetyl, fosetyl-aluminum, iprobenfos, phosphorous acid and its salts, pyrazophos, tolclofos-methyl;

organochlorine compounds: chlorothalonil, dichlofluanid, dichlorophen, flusulfamide, hexachlorobenzene, pencycuron, pentachlorphenole and its salts, phthalide, quintozene, thiophanate-methyl, tolylfluanid, N-(4-chloro-2-nitro-phenyl)-N-ethyl-4-methyl-benzenesulfonamide;

inorganic active substances: Bordeaux mixture, copper acetate, copper hydroxide, copper oxychloride, basic copper sulfate, sulfur;

others: biphenyl, bronopol, cyflufenamid, chloroneb, cymoxanil, dicloran, tecnazene, diphenylamin, metrafenone, mildiomycin, oxin-copper, prohexadione-calcium, spiroxamine, tolylfluanid, N-(cyclopropylmethoxyimino-(6-difluoro-methoxy-2,3-difluoro-phenyl)-methyl)-2-phenyl acetamide, N'-(4-(4-chloro-3-trifluoromethyl-phenoxy)-2,5-dimethyl-phenyl)-N-ethyl-N-methyl formamidine, N'-(4-(4-fluoro-3-trifluoromethyl-phenoxy)-2,5-dimethyl-phenyl)-N-ethyl-N-methyl formamidine, N'-(2-methyl-5-trifluoromethyl-4-(3-trimethylsilanyl-propoxy)-phenyl)-N-ethyl-N-methyl formamidine, N'-(5-difluoromethyl-2-methyl-4-(3-tri-methylsilanyl-propoxy)-phenyl)-N-ethyl-N-methyl formamidine, 2-{1-[2-(5-methyl-3-trifluoromethyl-pyrazole-1-yl)-acetyl]-piperidin-4-yl}-thiazole-4-carboxylic acid methyl-(1,2,3,4-tetrahydro-naphthalen-1-yl)-amide, 2-{1-[2-(5-methyl-3-trifluoromethyl-pyrazole-1-yl)-acetyl]-piperidin-4-yl}-thiazole-4-carboxylic acid methyl-(R)-1,2,3,4-tetrahydro-naphthalen-1-yl-amide, acetic acid 6-tert-butyl-8-fluoro-2,3-dimethyl-quinolin-4-yl ester and methoxy-acetic acid 6-tert-butyl-8-fluoro-2,3-dimethyl-quinolin-4-yl ester;

and

G) biological control agents.

Biological control is defined as the reduction of pest population by natural enemies and typically involves an active human role. The biological control of plant diseases is most often based on an antagonistic action of the BCA. There are several mechanisms by which fungicidal biocontrol is thought to work, including the production of antifungal antibiotics, competition for nutrients and rhizosphere colonization.

Suitable biological control agents are selected from non-pathogenic bacteria, preferably selected from *Pseudomonas fluorescens, Pseudomonas putida. Streptomyces griseus, Streptomyces ochraceisleroticus, Streptomyces graminofaciens, Streptomyces corchousii, Streptomyces spiroverticillatus, Streptomyces griseoviridis, Streptomyces hygroscopicus, Bacillus subtilis, Bacillus cereus, Bacillus mycoides, Bacillus pumilus, Bacillus licheniformis, Bacillus thuringensis*, and metabolites produced from said bacteria; non-pathogenic fungi, preferably selected from *Trichoderma* spp., *Trichoderma harzianum, Trichoderma viridae, Verticillium lecanii, Sporidesmium sclerotiorum* and *Zygomycetes*, and metabolites produced from said fungi; resin acids; plant extracts of *Reynoutria sachalinensis*; and plant defence induction agents, preferably harpin.

More preferably, the at least one fungicide is selected from cyproconazole, difenoconazole, epoxiconazole, fluquinconazole, flusilazole, flutriafol, metconazole, myclobutanil, penconazole, propiconazole, prothioconazole, triadimefon, triadimenol, tebuconazole, tetraconazole, triticonazole, prochloraz, cyazofamid, benomyl, carbendazim, ethaboxam, azoxystrobin, dimoxystrobin, fluoxastrobin, fluxapyroxade, kresoxim-methyl, orysastrobin, picoxystrobin, pyraclostrobin, trifloxystrobin, bixafen, boscalid, sedaxane, fenhexamid, metalaxyl, isopyrazam, mefenoxam, ofurace, dimethomorph, flumorph, fluopicolid (picobenzamid), zoxamide, carpropamid, mandipropamid, fluazinam, cyprodinil, fenarimol, mepanipyrim, pyrimethanil, triforine, fludioxonil, dodemorph, fenpropimorph, tridemorph, fenpropidin, iprodione, vinclozolin, famoxadone, fenamidone, probenazole, proquinazid, acibenzolar-5-methyl, captafol, folpet, fenoxanil, quinoxyfen, 5-ethyl-6-octyl-[1,2,4]triazolo[1,5-a]pyrimidine-7-ylamine, mancozeb, metiram, propineb, thiram, iprovalicarb, flubenthiavalicarb (benthiavalicarb), propamocarb, dithianon, fentin salts, fosetyl, fosetyl-aluminium, $H_3PO_3$ and salts thereof, chlorthalonil, dichlofluanid, thiophanat-methyl, copper acetate, copper hydroxide, copper oxychloride, copper sulfate, sulfur, cymoxanil, metrafenone, spiroxamine and *Bacillus subtilis* and its metabolites.

In particular, the at least one fungicide is a strobilurin fungicide or is a carboxamide fungicide or is *Bacillus subtilis* and/or its metabolites or is a combination of at least two of these fungicides. Preferred strobilurins are selected from azoxystrobin, dimoxystrobin, fluoxastrobin, fluxapyroxade, kresoxim-methyl, orysastrobin, picoxystrobin, pyraclostrobin and trifloxystrobin. Specifically, the strobilurin fungicide is pyraclostrobin. Preferred carboxamide fungicides are boscalid and fluxapyroxade and specifically fluxapyroxade.

In the above treatments, if not specified otherwise [like in case of step (iii)], the at least one insecticide [to be more precise, the at least one insecticide optionally used in step (iii), (vi), (viii), (ix) and/or (x)] is preferably selected from
a) pyrethroid compounds selected from acrinathrin, allethrin, d-cis-trans allethrin, d-trans allethrin, bifenthrin, bioallethrin, bioallethrin S-cylclopentenyl, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin, deltamethrin, empenthrin, esfenvalerate, etofenprox, fenpropathrin, fenvalerate, flucythrinate, flumethrin, tau-fluvalinate, halfenprox, imiprothrin, metofluthrin, permethrin, phenothrin, prallethrin, profluthrin, pyrethrin (pyrethrum), resmethrin, silafluofen, tefluthrin, tetramethrin, tralomethrin and transfluthrin;
b) nicotinic receptor agonists/antagonists compounds selected from acetamiprid, bensultap, cartap hydrochloride, clothianidin, dinotefuran, imidacloprid, thiamethoxam, nitenpyram, nicotine, spinosad (allosteric agonist), spinetoram (allosteric agonist), thiacloprid, thiocyclam, thiosultap-sodium and AKD1022;
c) GABA gated chloride channel antagonist compounds selected from acetoprole, endosulfan, vaniliprole, pyrafluprole, pyriprole, the phenylpyrazole compound of the formula II

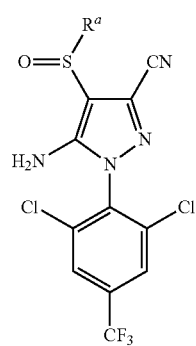

where $R^a$ is $C_1$-$C_4$-alkyl or $C_1$-$C_4$-haloalkyl;
or an agriculturally acceptable salt thereof;
and the phenylpyrazole compound of the formula III

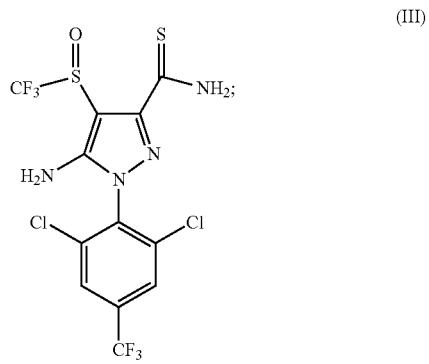 [SMILES: NC(=S)c1nn(-c2c(Cl)cc(C(F)(F)F)cc2Cl)c(N)c1S(=O)C(F)(F)F]

d) chloride channel activators selected from abamectin, emamectin benzoate, milbemectin and lepimectin; and
(e) inhibitors of chitin biosynthesis:
  (e1) benzoyl ureas: bistrifluoron, chlorfluazuron, diflubenzuron, flucycloxuron, flufenoxuron, hexaflumuron, lufenuron, novaluron, noviflumuron, teflubenzuron, triflumuron.

More preferably, the at least one insecticide is selected from fipronil, acetamiprid, clothianidin, imidacloprid, thiamethoxam, abamectin and teflubenzuron, even more preferably from fipronil and thiamethoxam and is specifically fipronil.

In the above treatments, the at least one nematicide is preferably selected from
antibiotic nematicides, such as abamectin;
botanical nematicides, such as carvacrol;
extracts of *Quillaja* or *Gleditsia*;
saponines;
carbamate nematicides selected from benomyl, carbofuran, carbosulfan and cloethocarb;
oxime carbamate nematicides selected from alanycarb, aldicarb, aldoxycarb, oxamyl and tirpate;
fumigant nematicides selected from dithioether and methyl bromide;
organophosphorus nematicides:
  organophosphate nematicides selected from diamidafos; fenamiphos; fosthietan and phosphamidon;
  organothiophosphate nematicides selected from cadusafos, chlorpyrifos, dichlofenthion, dimethoate, ethoprophos, fensulfothion, fosthiazate, heterophos, isamidofos, isazofos, phorate, phosphocarb, terbufos, thionazin and triazophos;
  phosphonothioate nematicides selected from imicyafos and mecarphon; and
unclassified nematicides selected from acetoprole, benclothiaz, chloropicrin, dazomet, DBCP, DCIP, 1,2-dichloropropane, 1,3-dichloropropene, fluensulfone, furfural, metam, methyl iodide, methyl isothiocyanate and xylenols.

Specifically, the at least one nematicide is abamectin.

In the above treatments, the growth-promoting bacteria are preferably selected from bacteria of the genera *azospirillum, azotobacter, azomonas, bacillus, beijerinckia, burkholderia, clostridium, cyanobacteria, enterobacter, erwinia, gluconobacter, klebsiella* and *streptomyces*.

More preferably, the growth-promoting bacteria are selected from *Azospirillum amazonense, Herbaspirillum*

*seropedicae, Herbaspirillum rubrisubalbicans, Burkholderia tropica, Gluconacetobacter diazotrophicus, Pseudomonas fluorescens, Pseudomonas putida. Streptomyces griseus, Streptomyces ochraceisleroticus, Streptomyces graminofaciens, Streptomyces corchousii, Streptomyces spiroverticillatus, Streptomyces griseovirdis, Streptomyces hygroscopicus, Bacillus subtilis, Bacillus cereus, Bacillus mycoides, Bacillus pumilus, Bacillus licheniformis* and *Bacillus thuringensis*.

In the above treatments, the at least one growth regulator is preferably selected from acylcyclohexanediones, such as prohexadione, prohexaione-Ca, trinexapac or trinexapac ethyl; mepiquat chloride and chlormequatchloride. More preferably, the at least one growth regulator is selected from acylcyclohexanediones, such as prohexadione, prohexaidone-Ca, trinexapac or trinexapac ethyl, and in particular from prohexaidone-Ca and trinexapac ethyl.

The at least one rooting enabler is preferably selected from the above strobilurin fungicides, in particular fluxapyroxade and pyraclostrobin, the above nicotinic receptor agonists/antagonists, in particular clothianidin, imidacloprid and thiamethoxam, auxins, such as 4-CPA, 2,4-D, 2,4-DB, 2,4-DEP, dichlorprop, fenoprop, IAA, IBA, naphthaleneacetamide, α-naphthaleneacetic acid, 1-naphthol, naphthoxyacetic acids, potassium naphthenate, sodium naphthenate and 2,4,5-T; gibberellins, gibberellic acid, cytokinins, such as 2iP, benzyladenine, 4-hydroxyphenethyl alcohol, kinetin and zeatin; and humic acids, extracts of *Quillaja* or *Gleditsia*, saponines, biological control agents and plant defence induction agents.

Suitable fertilizers are those customarily used in the cultivation of sugar cane plants, such as NPK fertilizers, ammonium sulfate, ammonium phosphate, ammonium nitrate, ureas, products of vegetable origin, such as cereal meal, tree bark meal, wood meal, nutshell meal and mulch, and mixtures thereof.

The at least one superabsorber is preferably a superabsorbent polymer having an absorption capacity for deionised water of least 100 g/1 g of polymer. Superabsorbent polymers are well-known synthetic organic polymers which are solid and hydrophilic, which are insoluble in water, and which are capable of absorbing a multiple of their weight of water or aqueous solutions, thereby forming a water containing polymer gel. They may be nonionic or ionic cross-linked polymers. Suitable superabsorbent polymers are for example known from U.S. Pat. No. 4,417,992, U.S. Pat. No. 3,669,103, WO 01/25493 and WO 2008/031870. They are also commercially available, e.g. from SNF SA., France, under the trademark Aquasorb®, e.g. 3500 S, or from BASF SE under the trade names Luquasorb®, e.g. Luquasorb® 1010, Luquasorb® 1280, Luquasorb® 1060, Luquasorb® 1160, Luquasorb® 1061 and HySorb®.

The fungicides, insecticides, nematicides, growth regulators and rooting enablers are generally used as ready-to-use preparations. In the following, suitable ready-to-use preparations containing at least one fungicide, insecticide, nematicide, growth regulator or rooting enabler (called in the following "active ingredient") are described.

In ready-to-use preparations, the active ingredient can be present in suspended, emulsified or dissolved form. The application forms depend entirely on the intended uses.

The active ingredient can be applied as such, in the form of its formulations or the application form prepared therefrom, for example in the form of directly sprayable solutions, powders, suspensions or dispersions, including highly concentrated aqueous, oily or other suspensions or dispersions, emulsions, oil dispersions, pastes, dusts, compositions for broadcasting or granules. Application is for example by spraying, immersing, dousing, sprinkling, spraying, dipping, coating, dressing, atomizing, dusting, broadcasting or watering. The application forms and methods depend on the intended uses; in each case, they should ensure the finest possible distribution of the active compounds. As regards suitable and preferred application techniques of the active agents mandatorily used in step (iii), reference is made to the above remarks.

Depending on the embodiment in which the ready-to-use preparations of the active ingredient is present, they comprise one or more liquid or solid carriers, if appropriate surfactants and if appropriate further auxiliaries customary for formulating crop protection agents. The recipes for such formulations are familiar to the person skilled in the art.

Aqueous application forms can be prepared, for example, from emulsion concentrates, suspensions, pastes, wettable powders or water-dispersible granules by addition of water. To prepare emulsions, pastes or oil dispersions, the active compounds, as such or dissolved in an oil or solvent, can be homogenized in water by means of a wetting agent, tackifier, dispersant or emulsifier. However, it is also possible to prepare concentrates composed of active substance, wetting agent, tackifier, dispersant or emulsifier and, if appropriate, solvent or oil, such concentrates being suitable for dilution with water.

The concentrations of the active ingredient in the ready-to-use preparations can be varied within relatively wide ranges. In general, they are between 0.0001 and 10%, preferably between 0.01 and 1% (% by weight total content of active compound, based on the total weight of the ready-to-use preparation).

The active ingredient may also be used successfully in the ultra-low-volume process (ULV), it being possible to employ formulations comprising more than 95% by weight of active compound, or even to apply the active ingredient without additives.

Oils of various types, wetting agents, adjuvants, bactericides and/or fertilizers may be added to the active ingredient, even, if appropriate, not until immediately prior to use (tank mix). These agents can be mixed in a weight ratio of from 1:100 bis 100:1, preferably from 1:10 to 10:1 with the active ingredient employed.

Adjuvants are for example: modified organic polysiloxanes, e.g. Break Thru S 240®; alcohol alkoxylates, e.g. Atplus 245®, Atplus MBA 1303®, Plurafac LF 300® and Lutensol ON 30®; EO-PO block copolymers, e.g. Pluronic RPE 2035® and Genapol B®; alkohol ethoxylates, e.g. Lutensol XP 80®; and sodium dioctylsulfosuccinate, e.g. Leophen RA®.

The formulations are prepared in a known manner, for example by extending the active ingredient with solvents and/or carriers, if desired with the use of surfactants, i.e. emulsifiers and dispersants. Solvents/carriers suitable for this purpose are essentially:

water, aromatic solvents (for example Solvesso products, xylene), paraffins (for example mineral oil fractions), alcohols (for example methanol, butanol, pentanol, benzyl alcohol), ketones (for example cyclohexanone, methyl hydroxybutyl ketone, diacetone alcohol, mesityl oxide, isophorone), lactones (for example gamma-butyrolactone), pyrrolidones (pyrrolidone, N-methylpyrrolidone, N-ethylpyrrolidone, n-octylpyrrolidone), acetates (glycol diacetate), glycols, dimethyl fatty acid amides, fatty acids and fatty acid esters. In principle, solvent mixtures may also be used.

Carriers such as ground natural minerals (for example kaolins, clays, talc, chalk) and ground synthetic minerals (for example finely divided silica, silicates); emulsifiers (for example nonionic and anionic emulsifiers (for example polyoxyethylene fatty alcohol ethers, alkylsulfonates and arylsulfonates), and dispersants such as lignosulfite waste liquors and methylcellulose.

Suitable surfactants are alkali metal salts, alkaline earth metal salts and ammonium salts of lignosulfonic acid, naphthalenesulfonic acid, phenolsulfonic acid, dibutylnaphthalenesulfonic acid, alkylarylsulfonates, alkyl sulfates, alkylsulfonates, fatty alcohol sulfates, fatty acids and sulfated fatty alcohol glycol ethers, furthermore condensates of sulfonated naphthalene and naphthalene derivatives with formaldehyde, condensates of naphthalene or of naphthalenesulfonic acid with phenol and formaldehyde, polyoxyethylene octylphenol ether, ethoxylated isooctylphenol, octylphenol, nonylphenol, alkylphenyl polyglycol ether, tributylphenyl polyglycol ether, tristerylphenyl polyglycol ether, alkylaryl polyether alcohols, alcohol and fatty alcohol ethylene oxide condensates, ethoxylated castor oil, polyoxyethylene alkyl ethers, ethoxylated polyoxypropylene, lauryl alcohol polyglycol ether acetal, sorbitol esters, lignosulfite waste liquors and methylcellulose.

Suitable for the preparation of directly sprayable solutions, emulsions, pastes or oil dispersions are mineral oil fractions of medium to high boiling point, such as kerosene or diesel oil, furthermore coal tar oils and oils of vegetable and animal origin, aliphatic, cyclic and aromatic hydrocarbons, for example toluene, xylene, paraffin, tetrahydronaphthalene, alkylated naphthalenes or their derivatives, methanol, ethanol, propanol, butanol, cyclohexanol, cyclohexanone, mesityl oxide, isophorone, strongly polar solvents, for example dimethyl sulfoxide, 2-yrrolidone, N-methylpyrrolidone, butyrolactone, or water.

Powders, compositions for broadcasting and dusts can be prepared by mixing or jointly grinding the active ingredient with a solid carrier.

Granules, for example coated granules, impregnated granules and homogeneous granules, can be prepared by binding the active ingredient onto solid carriers. Solid carriers are, for example, mineral earths such as silica gels, silicates, talc, kaolin, attaclay, limestone, lime, chalk, bole, loess, clay, dolomite, diatomaceous earth, calcium sulfate, magnesium sulfate, magnesium oxide, ground synthetic materials, fertilizers such as, for example, ammonium sulfate, ammonium phosphate, ammonium nitrate, ureas and plant products such as cereal meal, tree bark meal, wood meal and nutshell meal, cellulose powder and other solid carriers.

Formulations for bud treatment can further comprise binders and/or gelling agents and optionally colorants.

In general, the formulations comprise between 0.01 and 95% by weight, preferably between 0.1 and 90% by weight, in particular 5 to 50% by weight, of the active ingredient. In this context, the active ingredient is employed in a purity of from 90% to 100%, preferably 95% to 100% (according to NMR spectrum).

After two- to ten-fold dilution, formulations for bud treatment may comprise 0.01 to 60% by weight, preferably 0.1 to 40% by weight of the active ingredient in the ready-to-use preparations.

Examples of formulations are:
1. Products for dilution in water
  I) Water-soluble concentrates (SL, LS)
    10 parts by weight of active compound are dissolved in 90 parts by weight of water or a water-soluble solvent. Alternatively, wetting agents or other adjuvants are added. Upon dilution in water, the active compound dissolves. The ready formulation contains 10% by weight of active ingredient.
  II) Dispersible concentrates (DC)
    20 parts by weight of active compound are dissolved in 70 parts by weight of cyclohexanone with addition of 10 parts by weight of a dispersant, for example polyvinylpyrrolidone. The active ingredient is contained in 20% by weight. Upon dilution in water, a dispersion results.
  III) Emulsifiable concentrates (EC)
    15 parts by weight of active compound are dissolved in 75 parts by weight of xylene with addition of calcium dodecylbenzenesulfonate and castor oil ethoxylate (in each case 5 parts by weight). The active ingredient is contained in 15% by weight. Upon dilution in water, an emulsion results.
  IV) Emulsions (EW, EO, ES)
    25 parts by weight of active compound are dissolved in 35 parts by weight of xylene with addition of calcium dodecylbenzenesulfonate and castor oil ethoxylate (in each case 5 parts by weight). This mixture is introduced into 30 parts by weight of water by means of an emulsifier (Ultraturrax) and made into a homogeneous emulsion. The active ingredient is contained in 25% by weight. Upon dilution in water, an emulsion results.
  V) Suspensions (SC, OD, FS)
    20 parts by weight of active compound are comminuted in a stirred ball mill with addition of 10 parts by weight of dispersants, wetting agents and 70 parts by weight of water or an organic solvent to give a fine suspension of active compound. The active ingredient is contained in 20% by weight. Upon dilution in water, a stable suspension of the active compound results.
  VI) Water-dispersible and water-soluble granules (WG, SG)
    50 parts by weight of active compound are ground finely with addition of 50 parts by weight of dispersants and wetting agents and made into water-dispersible or water-soluble granules by means of technical apparatuses (for example extrusion, spray tower, fluidized bed). The active ingredient is contained in 50% by weight. Upon dilution in water, a stable dispersion or solution of the active compound results.
  VII) Water-dispersible and water-soluble powders (WP, SP, SS, WS)
    75 parts by weight of active compound are ground in a rotor-stator mill with addition of 25 parts by weight of dispersants, wetting agents and silica gel. The active ingredient is contained in 75% by weight. Upon dilution in water, a stable dispersion or solution of the active compound results.
  VIII) Gel formulations (GF)
    20 parts by weight of active compound, 10 parts by weight of dispersants, 1 part by weight of gelling agent and 70 parts by weight of water or an organic solvent are ground in a ball mill to give a finely divided suspension. Upon dilution in water, a stable suspension of the active compound results.
2. Products for Direct Application
  IX) Dusts (DP, DS)
    5 parts by weight of active compound are ground finely and mixed intimately with 95 parts by weight of finely particulate kaolin. This gives a dust with 5% by weight of active ingredient.

X) Granules (GR, FG, GG, MG)

0.5 part by weight of active compound is ground finely and combined with 95.5 parts by weight of carriers. Current methods are extrusion, spray drying or the fluidized bed. This gives granules for direct application with 0.5% by weight of active ingredient.

XI) ULV solutions (UL)

10 parts by weight of active compound are dissolved in 90 parts by weight of an organic solvent, for example xylene. This gives a product for direct application with 10% by weight of active ingredient.

Formulations suitable for treating the buds are, for example:

I soluble concentrates (SL, LS)
III emulsifiable concentrates (EC)
IV emulsions (EW, EO, ES)
V suspensions (SC, OD, FS)
VI water-dispersible and water-soluble granules (WG, SG)
VII water-dispersible and water-soluble powders (WP, SP, WS)
VIII gel formulations (GF)
IX dusts and dust-like powders (DP, DS)

Preferred formulations to be used for bud treatment are FS formulations. Generally, theses formulations comprise 1 to 800 g/l of active compounds, 1 to 200 g/l of wetting agents, 0 to 200 g/l of antifreeze agents, 0 to 400 g/l of binders, 0 to 200 g/l of colorants (pigments and/or dyes) and solvents, preferably water.

Preferred FS formulations of the active compounds for the treatment of the buds usually comprise from 0.5 to 80% of active compound, from 0.05 to 5% of wetting agent, from 0.5 to 15% of dispersant, from 0.1 to 5% of thickener, from 0 to 20% of antifreeze agent, from 0 to 2% of antifoam, from 0 to 15% of tackifier or adhesive, from 0 to 75% of filler/vehicle, and from 0.01 to 1% of preservative.

Suitable wetting agents and dispersants are in particular the surfactants mentioned above. Preferred wetting agents are alkylnaphthalenesulfonates, such as diisopropyl- or diisobutylnaphthalenesulfonates. Preferred dispersants are nonionic or anionic dispersants or mixtures of nonionic or anionic dispersants. Suitable nonionic dispersants are in particular ethylene oxide/propylene oxide block copolymers, alkylphenol polyglycol ethers and also tristryrylphenol polyglycol ether, for example polyoxyethylene octylphenol ether, ethoxylated isooctylphenol, octylphenol, nonylphenol, alkylphenol polyglycol ethers, tributylphenyl polyglycol ether, tristerylphenyl polyglycol ether, alkylaryl polyether alcohols, alcohol and fatty alcohol/ethylene oxide condensates, ethoxylated castor oil, polyoxyethylene alkyl ethers, ethoxylated polyoxypropylene, lauryl alcohol polyglycol ether acetal, sorbitol esters and methylcellulose. Suitable anionic dispersants are in particular alkali metal, alkaline earth metal and ammonium salts of lignosulfonic acid, naphthalenesulfonic acid, phenolsulfonic acid, dibutylnaphthalenesulfonic acid, alkylarylsulfonates, alkyl sulfates, alkylsulfonates, fatty alcohol sulfates, fatty acids and sulfated fatty alcohol glycol ethers, furthermore arylsulfonate/formaldehyde condensates, for example condensates of sulfonated naphthalene and naphthalene derivatives with formaldehyde, condensates of naphthalene or of naphthalenesulfonic acid with phenol and formaldehyde, lignosulfonates, lignosulfite waste liquors, phosphated or sulfated derivatives of methylcellulose and polyacrylic acid salts.

Suitable for use as antifreeze agents are, in principle, all substances which lower the melting point of water. Suitable antifreeze agents include alkanols, such as methanol, ethanol, isopropanol, the butanols, glycol, glycerol, diethylene glycol and the like.

Suitable thickeners are all substances which can be used for such purposes in agrochemical compositions, for example cellulose derivatives, polyacrylic acid derivatives, xanthane, modified clays and finely divided silica.

Suitable for use as antifoams are all defoamers customary for formulating agrochemically active compounds. Particularly suitable are silicone antifoams and magnesium stearate.

Suitable for use as preservatives are all preservatives which can be employed for such purposes in agrochemical compositions. Dichlorophene, isothiazolenes, such as 1,2-benzisothiazol-3(2H)-one, 2-methyl-2H-isothiazol-3-one hydrochloride, 5-chloro-2-(4-chlorobenzyl)-3(2H)-isothiazolone, 5-chloro-2-methyl-2H-isothiazol-3-one, 5-chloro-2-methyl-2H-isothiazol-3-one, 5-chloro-2-methyl-2H-isothiazol-3-one hydrochloride, 4,5-dichloro-2-cyclohexyl-4-isothiazolin-3-one, 4,5-dichloro-2-octyl-2H-isothiazol-3-one, 2-methyl-2H-isothiazol-3-one, 2-methyl-2H-isothiazol-3-one calcium chloride complex, 2-octyl-2H-isothiazol-3-one, and benzyl alcohol hemiformal may be mentioned by way of example.

Adhesives/tackifiers may be added to improve the adhesion of the effective components on the buds after treating. Suitable adhesives are EO/PO-based block copolymer surfactants, but also polyvinyl alcohols, polyvinyl pyrrolidones, polyacrylates, polymethacrylates, polybutenes, polyisobutenes, polystyrene, polyethyleneamines, polyethyleneamides, polyethyleneimines (Lupasol®, Polymin®), polyethers and copolymers derived from these polymers.

Suitable compositions for soil treatment include granules which may be applied in-furrow, as broadcast granules or as impregnated fertilizer granules, and also spray applications which are applied to the soil as a preemergent or postemergent spray.

Suitable compositions for treating the plants, in particular the overground parts thereof, especially the seedlings (especially the seedlings' leaves), include spray applications, dusts and microgranules, spray applications being preferred.

Formulations suitable for producing spray solutions for the direct application are:

I soluble concentrates (SL, LS)
II) dispersible concentrates (DC)
III emulsifiable concentrates (EC)
IV emulsions (EW, EO)
V suspensions (SC)
VI water-dispersible and water-soluble granules (WG)
VII water-dispersible and water-soluble powders (WP, SP)

For treating the buds (before planting), it is possible to use some of the methods customary for treating or dressing seed, such as, but not limited to, immersing, dousing, sprinkling, spraying, dressing, coating, dusting, soaking, film coating or dripping the buds with or into the active ingredient or a preparation thereof. For example, the treatment may be carried out by mixing the buds with the particular amount desired of active ingredient formulations either as such or after prior dilution with water in an apparatus suitable for this purpose, for example a mixing apparatus for solid or solid/liquid mixing partners, until the composition is distributed uniformly on the buds. If appropriate, this is followed by a drying operation.

The superabsorbers are generally applied to the growth medium or the field by mixing the growth medium or the soil with them or by applying the desired amount of superabsorber into the holes digged for the bud or the seedling. The latter method is preferred for the application of superabsorbers to the field.

By the method according to the invention significantly less area is required for reproduction of the sugar cane plants as compared to traditional methods. In comparison with the multiplication method Plene® the present method offers a greater flexibility as the buds can be stored and transported to any place. The method of the invention also reduces the risk of having non-sprouting sugar cane plants in the filed, which wastes valuable farming land. As the buds/seedlings are protected during the sensitive first growth stages and are only transplanted to the field or exposed to ambient conditions after their rooting system is well developed, the method leads to healthy and vigorous seedlings and adult sugar cane plants growing therefrom. Especially carrying out step (iii) leads to particularly healthy and vigorous seedlings and adult sugar cane plants growing therefrom and significantly increases the survival rate of the planted buds. Particularly, an increased number of tillers is generally observed, especially if a strobilurin fungicide, especially pyraclostrobin, is used in step (iii). Without wishing to be bound by theory, it is supposed that this is due to a reduced apical dominance induced by the treatment. Later treatments are also useful, but have a much weaker influence on the development of the seedlings or adult plants than this early treatment in step (iii). Planting of the seedlings to the field with a semiautomatic or automatic planting machine makes the method of the invention even more effective and advantageous; see the above remarks.

EXAMPLES

Example 1

On an area of 0.1 hectares where sugar cane plants were growing with a distance between the rows of 1.5 m, the top part of the 8 months old sugar cane plants was removed by chopping off with a machete in a height of approximately 2 to 2.5 m. The removed top part was discarded. The below, remaining stalks were removed from the field by cutting them off closely above the ground. The stalks were then cut longitudinally into halves in such a manner that the buds were approximately centralized on the halves. From the stalk halves discs of ca. 2 cm of diameter each containing a bud and a part of the respective node were punched off with a punching machine. For each treatment, 648 bud discs were immersed for 10 seconds into an aqueous solution containing either pyraclostrobin (1 g/l; used as the commercial product Comet® of a concentration of 250 g/l of pyraclostrobin) or fipronil (0.8 g/l; used as the commercial product Regent® of a concentration of 800 g/kg of fipronil) or fluxapyroxade (1.2 g/l; used as the commercial product BAS 700 04F of a concentration of 300 g/l) or thiamethoxam (1.5 g/l; used as the commercial product Actara® 250 WG of a concentration of 250 WI). The treated buds were then each placed in individual pots filled with humid coconut fibers. 648 bud discs stayed untreated for comparative reasons and were directly placed in individual pots filled with humid coconut fibers. The pots were placed in a greenhouse, and seedlings were grown from the planted bud discs at 25 to 35° C. and 70 to 80% humidity. While in the greenhouse, the buds/seedlings were watered sufficiently. 30 to 45 days after having been placed in the greenhouse, the surviving seedlings were transferred in an acclimatization area and kept for 15 days. Thereafter they were counted and then transplanted to a field. The results are compiled in the table below.

TABLE

| Treatment | Concentration active ingredient [g/l] | Number of planted buds | Number of surviving seedlings | Increase of survival rate [%] |
|---|---|---|---|---|
| - (untreated) | — | 648 | 211 | — |
| Pyraclostrobin | 1 | 648 | 391 | 85.3 |
| Fipronil | 0.8 | 648 | 236 | 11.8 |
| Fluxapyroxade | 1.2 | 648 | 248 | 17.5 |
| Thiamethoxam | 1.5 | 648 | 225 | 6.6 |

We claim:
1. A method for cultivating sugar cane comprising
(i) removing buds with a part of the node to which they are attached, but not with the whole node, from the stalk of a 6 to 18 months old sugar cane plant;
(ii) optionally subjecting the buds to a sterilization treatment;
(iii) treating the buds with at least one active agent selected from the group consisting of strobilurin fungicides, carboxamide fungicides, GABA antagonist insecticides, nicotinic receptor agonist/antagonist insecticides, chloride channel activator insecticides and mixtures thereof, and optionally also with at least one agent selected from the group consisting of fungicides different therefrom, insecticides different therefrom, nematicides, growth regulators, rooting enablers, growth-promoting bacteria and mixtures thereof;
(iv) optionally refrigerating the buds;
where the sequence of steps (ii), (iii) and (iv) are interchangeable;
(v) planting the buds obtained in step (ii), (iii) or (iv) in a growth medium;
(vi) optionally treating the growth medium before, during or shortly after planting with at least one fertilizer, at least one fungicide, at least one insecticide, at least one nematicide, at least one growth regulator, at least one superabsorber, or growth-promoting bacteria or a combination thereof;
(vii) growing seedlings from the buds at a temperature of at least 15° C.;
(viii) optionally treating at least one of the seedlings, while growing, or their growth medium with at least one fungicide, at least one insecticide, at least one nematicide, at least one growth regulator, at least one rooting enabler, or growth-promoting bacteria or a combination thereof;
(ix) 10 to 120 days after planting the buds in the growth medium, if the growth medium is not a field, planting the seedlings obtained from the buds to the field, where the field has optionally been treated with at least one fertilizer, at least one fungicide, at least one insecticide, at least one nematicide, at least one growth regulator, at least one superabsorber, or growth-promoting bacteria or a combination thereof, before or during planting, or, in case the growth medium is a field, exposing the seedlings obtained from the buds to ambient conditions; and
(x) optionally treating at least one of the seedlings or the field during or after planting in the field or after exposing to ambient conditions with at least one fertilizer, at least one fungicide, at least one insecticide, at least one nematicide, at least one growth regulator, at least one superabsorber, growth-promoting bacteria, or at least one freshness-preservation polymer or a combination thereof;

where the at least one strobilurin fungicide of step (iii) is selected from the group consisting of azoxystrobin, dimoxystrobin, enestroburin, fluoxastrobin, kresoxim-methyl, metominostrobin, orysastrobin, picoxystrobin, pyraclostrobin, pyraoxystrobin, pyrametostrobin, pyribencarb, trifloxystrobin, 2-(2-(6-(3-chloro-2-methyl-phenoxy)-5-fluoro-pyrimidin-4-yloxy)-phenyl)-2-methoxyimino-N-methyl-acetamide, 3-methoxy-2-(2-(N-(4-methoxy-phenyl)-cyclopropane-carboximidoyl-sulfanylmethyl)-phenyl)-acrylic acid methyl ester, methyl (2-chloro-5-[1-(3-methylbenzyloxyimino)ethyl]benzyl) carbamate and 2-(2-(3-(2,6-dichlorophenyl)-1-methyl-allylideneaminooxymethyl)-phenyl)-2-methoxyimino-N-methyl-acetamide;

where the at least one carboxamide fungicide of step (iii) is selected from the group consisting of benalaxyl, benalaxyl-M, benodanil, bixafen, boscalid, carboxin, fenfuram, fenhexamid, flutolanil, furametpyr, isopyrazam, isotianil, kiralaxyl, mepronil, metalaxyl, metalaxyl-M (mefenoxam), ofurace, oxadixyl, oxycarboxin, penthiopyrad, sedaxane, tecloftalam, thifluzamide, tiadinil, 2-amino-4-methyl-thiazole-5-carboxanilide, 2-chloro-N-(1,1,3-trimethyl-indan-4-yl)-nicotinamide, N-(3',4',5'-trifluorobiphenyl-2-yl)-3-difluoromethyl-1-methyl-1H-pyrazole-4-carboxamide (fluxapyroxad), N-(4'-trifluoromethylthiobiphenyl-2-yl)-3-difluoromethyl-1-methyl-1H-pyrazole-4-carboxamide, N-(2-(1,3-dimethyl-butyl)-phenyl)-1,3-dimethyl-5-fluoro-1H-pyrazole-4-carboxamide and N-(2-(1,3,3-trimethyl-butyl)-phenyl)-1,3-dimethyl-5-fluoro-1H-pyrazole-4-carboxamide, dimethomorph, flumorph, pyrimorph, flumetover, fluopicolide, fluopyram, zoxamide, N-(3-ethyl-3,5,5-trimethyl-cyclohexyl)-3-formylamino-2-hydroxy-benzamide, carpropamid, dicyclomet, mandiproamid, oxytetracyclin, silthiofam and N-(6-methoxy-pyridin-3-yl) cyclopropanecarboxylic acid amide;

where the at least one GABA antagonist of step (iii) is selected from the group consisting of acetoprole, endosulfan, vaniliprole, pyrafluprole, pyriprole, the phenylpyrazole compound of the formula II

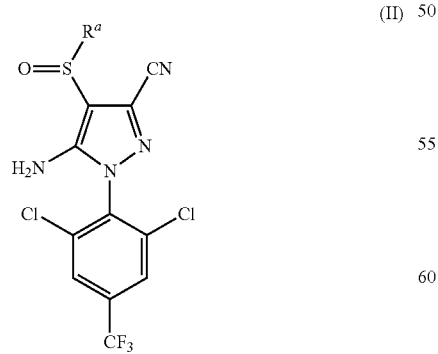

where $R^a$ is $C_1$-$C_4$-alkyl or $C_1$-$C_4$-haloalkyl;
or an agriculturally acceptable salt thereof;
and the phenylpyrazole compound of the formula III

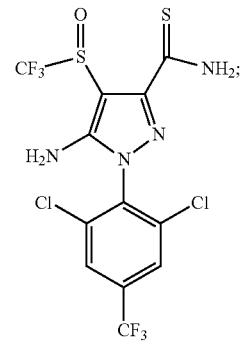

or an agriculturally acceptable salt thereof;

where the at least one nicotinic receptor agonist/antagonist insecticide of step (iii) is selected from the group consisting of acetamiprid, bensultap, cartap hydrochloride, clothianidin, dinotefuran, imidacloprid, thiamethoxam, nitenpyram, nicotine, spinosad (allosteric agonist), spinetoram (allosteric agonist), thiacloprid, thiocyclam, thiosultap-sodium and AKD1022; and where the at least one chloride channel activator insecticide of step (iii) is selected from the group consisting of abamectin, emamectin, ivermectin, lepimectin and milbemectin.

2. The method as claimed in claim 1, where step (i) is carried out when the plant is 8 to 12 months old.

3. The method as claimed in claim 1, where in step (i) the buds are removed by punching them out of the stalk.

4. The method as claimed in claim 1, where in step (i) the buds are removed by cutting the stalk of the sugar cane plant longitudinally and removing stalk pieces containing buds from the resulting 2 stalk halves, where the stalk pieces have optionally the form of disks with a diameter of about 1 to 5 cm and contain the buds and a part of the node from which the respective buds originate.

5. The method as claimed in claim 1, where the sequence of steps (ii), (iii) and (iv) is as follows:
 a. only step (iii);
 b. step (ii) followed by step (iii);
 c. step (iii) followed by step (ii);
 d. step (iii) followed by step (iv);
 e. step (iv) followed by step (iii);
 f. step (ii) followed by step (iii) followed by step (iv);
 g. step (ii) followed by step (iv) followed by step (iii);
 h. step (iii) followed by step (ii) followed by step (iv);
 i. step (iv) followed by step (ii) followed by step (iii); or
 j. step (iii) followed by step (iv) followed by step (ii).

6. The method as claimed in claim 1, where the sterilization treatment of step (ii) is a heat treatment, a treatment with an alcohol solution, a treatment with a hypochlorite solution, γ-irradiation treatment or is a combination of these treatments.

7. The method as claimed in claim 1, where the at least one strobilurin fungicide used in step (iii) is pyraclostrobin.

8. The method as claimed in claim 1, where the at least one carboxamide fungicide used in step (iii) is selected from the group consisting of boscalid and fluxapyroxade.

9. The method as claimed in claim 1, where the GABA antagonist used in step (iii) is fipronil.

10. The method as claimed in claim 1, where the at least one nicotinic receptor agonist/antagonist insecticide used in step (iii) is selected from acetamiprid, clothianidin, imidacloprid and thiamethoxam.

11. The method as claimed in claim 1, where the at least one chloride channel activator insecticide used in step (iii) is abamectin.

12. The method as claimed in claim 1, where the buds are treated in step (iii) with the at least one active agent selected from strobilurin fungicides, carboxamide fungicides, GABA antagonist insecticides, nicotinic receptor agonist/antagonist insecticides, chloride channel activator insecticides and mixtures thereof by immersing the complete bud into a liquid medium containing said active agent.

13. The method as claimed in claim 1, where in step (v) the buds obtained in step (ii), (iii) or (iv) are planted in a container containing a growth medium.

14. The method as claimed in claim 13, where the container is placed in a greenhouse and in step (vii) seedlings are grown from the buds in the greenhouse.

15. The method as claimed in claim 1, where in step (v) the buds obtained in step (ii), (iii) or (iv) are planted in a growth medium and grown under a cover foil.

16. The method as claimed in claim 1, where in step (vii) the seedlings are grown from the buds at a temperature of from 18 to 35° C.

17. The method as claimed in claim 1, where in step (vii) the seedlings are grown from the buds at a humidity of from 40 to 100.

18. The method as claimed in claim 1, where in step (viii) at least one of the seedlings, while growing, or their growth medium are treated with at least one strobilurin fungicide, at least one carboxamide fungicide, at least one GABA antagonist insecticide, at least one nicotinic receptor agonist/antagonist insecticide, at least one chloride channel activator insecticide or a combination thereof and optionally also with at least one nematicide, at least one growth regulator, at least one rooting enabler, growth-promoting bacteria or a combination thereof.

19. The method as claimed in claim 1, where in step (ix) the planting of the seedling to the field is carried out using an automatic or semi-automatic planting machine.

20. The method as claimed in claim 1, where in step (ix) the planting of the seedling to the field or exposing of the seedling to ambient conditions is carried out 20 to 80 days.

21. The method as claimed in claim 1, where the at least one fungicide optionally used in steps (iii), (vi), (viii), (ix) or (x) is selected from
A) azoles, selected from the group consisting of
azaconazole, bitertanol, bromuconazole, cyproconazole, difenoconazole, diniconazole, diniconazole-M, epoxiconazole, etaconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole, 1-(4-chlorophenyl)-2-([1,2,4]triazol-1-yl)-cycloheptanol, cyazofamid, imazalil, pefurazoate, prochloraz, triflumizol, benomyl, carbendazim, fuberidazole, thiabendazole, ethaboxam, etridiazole, hymexazole and 2-(4-chloro-phenyl)-N-[4-(3,4-dimethoxy-phenyl)-isoxazol-5-yl]-2-prop-2-ynyloxy-acetamide;
B) strobilurins, selected from the group consisting of
azoxystrobin, dimoxystrobin, enestroburin, fluoxastrobin, kresoxim-methyl, metominostrobin, orysastrobin, picoxystrobin, pyraclostrobin, pyraoxystrobin, pyrametostrobin, pyribencarb, trifloxystrobin, 2-(2-(6-(3-chloro-2-methyl-phenoxy)-5-fluoro-pyrimidin-4-yloxy)-phenyl)-2-methoxyimino-N-methyl-acetamide, 3-methoxy-2-(2-(N-(4-methoxy-phenyl)-cyclopropane-carboximidoyl sulfanylmethyl)-phenyl)-acrylic acid methyl ester, methyl (2-chloro-5-[1-(3-methylbenzyloxyimino)-ethyl]benzyl)carbamate and 2-(2-(3-(2,6-dichlorophenyl)-1-methyl-allylidene-aminooxymethyl)-phenyl)-2-methoxyimino-N-methyl-acetamide;
C) carboxamides, selected from the group consisting of
benalaxyl, benalaxyl-M, benodanil, bixafen, boscalid, carboxin, fenfuram, fenhexamid, flutolanil, furametpyr, isopyrazam, isotianil, kiralaxyl, mepronil, metalaxyl, metalaxyl-M (mefenoxam), ofurace, oxadixyl, oxycarboxin, penthiopyrad, sedaxane, tecloftalam, thifluzamide, tiadinil, 2-amino-4-methyl-thiazole-5-carboxanilide, 2-chloro-N-(1,1,3-trimethyl-indan-4-yl)-nicotinamide, N-(3',4', 5 '-trifluorobiphenyl-2-yl)-3-difluoromethyl-1-methyl-1H-pyrazole-4-carboxamide (fluxapyroxade), N-(4'-trifluoromethylthiobiphenyl-2-yl)-3-difluoromethyl-1-methyl-1H-pyrazole-4-carboxamide, N-(2-(1,3-dimethyl-butyl)-phenyl)-1,3-dimethyl-5-fluoro-1H-pyrazole-4-carboxamide and N-(2-(1,3,3-trimethyl-butyl)-phenyl)-1,3-dimethyl-5-fluoro-1H-pyrazole-4-carboxamide, dimethomorph, flumorph, pyrimorph, flumetover, fluopicolide, fluopyram, zoxamide, N-(3-ethyl-3,5,5-trimethyl-cyclohexyl)-3-formylamino-2-hydroxy-benzamide, carpropamid, dicyclomet, mandipropamid, oxytetracyclin, silthiofam and N-(6-methoxy-pyridin-3-yl) cyclopropanecarboxylic acid amide;
D) heterocyclic compounds, selected from the group consisting of
fluazinam, pyrifenox, 3-[5-(4-chloro-phenyl)-2,3-dimethyl-isoxazolidin-3-yl]-pyridine, 3-[5-(4-methyl-phenyl)-2,3-dimethyl-isoxazolidin-3-yl]-pyridine, 2,3,5,6-tetra-chloro-4-methanesulfonyl-pyridine, 3,4,5-trichloropyridine-2,6-di-carbonitrile, N-(1-(5-bromo-3-chloro-pyridin-2-yl)-ethyl)-2,4-dichloronicotinamide, N-[(5-bromo-3-chloro-pyridin-2-yl)-methyl]-2,4-dichloro-nicotinamide, bupirimate, cyprodinil, diflumetorim, fenarimol, ferimzone, mepanipyrim, nitrapyrin, nuarimol, pyrimethanil, triforine, fenpiclonil, fludioxonil, aldimorph, dodemorph, dodemorph-acetate, fenpropimorph, tridemorph, fenpropidin, fluoroimid, iprodione, chlozolinate, procymidone, vinclozolin, famoxadone, fenamidone, flutianil, octhilinone, probenazole, 5-amino-2-isopropyl-3-oxo-4-ortho-tolyl-2,3-dihydro-pyrazole-1-carbothioic acid S-allyl ester, acibenzolar-S-methyl, amisulbrom, anilazin, blasticidin-S, captafol, captan, chinomethionat, dazomet, debacarb, diclomezine, difenzoquat, difenzoquat-methylsulfate, fenoxanil, Folpet, oxolinic acid, piperalin, proquinazid, pyroquilon, quinoxyfen, triazoxide, tricyclazole, 2-butoxy-6-iodo-3-propylchromen-4-one, 5-chloro-1-(4,6-dimethoxy-pyrimidin-2-yl)-2-methyl-1H-benzoimidazole, 5-chloro-7-(4-methylpiperidin-1-yl)-6-(2,4,6-trifluorophenyl)-[1,2,4]triazolo[1,5-a]pyrimidine and 5-ethyl-6-octyl-[1,2,4]triazolo[1,5-a]pyrimidine-7-ylamine;
E) carbamates, selected from the group consisting of
ferbam, mancozeb, maneb, metam, methasulphocarb, metiram, propineb, thiram, zineb, ziram, benthiavalicarb, pyributicarb, diethofencarb, iprovalicarb, iodocarb, propamocarb, propamocarb hydrochlorid, prothiocarb, valiphenal and N-(1-(1-(4-cyano-phenyl)ethanesulfonyl)-but-2-yl) carbamic acid-(4-fluorophenyl) ester;

F) other active compounds, selected from the group consisting of
  guanidines: guanidine, dodine, dodine free base, guazatine, guazatine-acetate, iminoctadine, iminoctadine-triacetate, iminoctadine-tris(albesilate);
  antibiotics: kasugamycin, kasugamycin hydrochloride-hydrate, streptomycin, polyoxine, validamycin A;
  nitrophenyl derivates: binapacryl, dinobuton, dinocap, meptyldinocap, nitrthal-isopropyl, tecnazen,
  organometal compounds: fentin salts;
  sulfur-containing heterocyclyl compounds: dithianon, isoprothiolane;
  organophosphorus compounds: edifenphos, fosetyl, fosetyl-aluminum, iprobenfos, phosphorous acid and its salts, pyrazophos, tolclofos-methyl;
  organochlorine compounds: chlorothalonil, dichlofluanid, dichlorophen, flusulfamide, hexachlorobenzene, pencycuron, pentachlorphenole and its salts, phthalide, quintozene, thiophanate-methyl, tolylfluanid, N-(4-chloro-2-nitro-phenyl)-N-ethyl-4-methyl-benzenesulfonamide;
  inorganic active substances: Bordeaux mixture, copper acetate, copper hydroxide, copper oxychloride, basic copper sulfate, sulfur;
  others: biphenyl, bronopol, cyflufenamid, chloroneb, cymoxanil, dicloran, tecnazene, diphenylamin, metrafenone, mildiomycin, oxin-copper, prohexadione-calcium, spiroxamine, tolylfluanid, N-(cyclopropylmethoxyimino-(6-difluoro-methoxy-2,3-difluoro-phenyl)-methyl)-2-phenyl acetamide, N'-(4-(4-chloro-3-trifluoromethyl-phenoxy)-2,5-dimethyl-phenyl)-N-ethyl-N-methyl formamidine, N'-(4-(4-fluoro-3-trifluoromethyl-phenoxy)-2,5-dimethyl-phenyl)-N-ethyl-N-methyl formamidine, N'-(2-methyl-5-trifluoromethyl-4-(3-trimethylsilanyl-propoxy)-phenyl)-N-ethyl-N-methyl formamidine, N'-(5-difluoromethyl-2-methyl-4-(3-trimethylsilanyl-propoxy)-phenyl)-N-ethyl-N-methyl formamidine, 2-{1-[2-(5-methyl-3-trifluoromethyl-pyrazole-1-yl)-acetyl]-piperidin-4-yl}-thiazole-4-carboxylic acid methyl-(1,2,3,4-tetrahydro-naphthalen-1-yl)-amide, 2-{1-[2-(5-methyl-3-trifluoromethyl-pyrazole-1-yl)-acetyl]-piperidin-4-yl}-thiazole-4-carboxylic acid methyl-(R)-1,2,3,4-tetrahydro-naphthalen-1-yl-amide, acetic acid 6-tert-butyl-8-fluoro-2,3-dimethyl-quinolin-4-yl ester and methoxy-acetic acid 6-tert-butyl-8-fluoro-2,3-dimethyl-quinolin-4-yl ester;

and

G) biological control agents.

22. The method as claimed in claim 21, where the biological control agents are selected from the group consisting of non-pathogenic bacteria, non-pathogenic fungi, resin acids, plant extracts of *Reynoutria sachalinensis*; and plant defence induction agents.

23. The method as claimed in claim 21, where the at least one fungicide is selected from the group consisting of cyproconazole, difenoconazole, epoxiconazole, fluquinconazole, flusilazole, flutriafol, metconazole, myclobutanil, penconazole, propiconazole, prothioconazole, triadimefon, triadimenol, tebuconazole, tetraconazole, triticonazole, prochloraz, cyazofamid, benomyl, carbendazim, ethaboxam, azoxystrobin, dimoxystrobin, fluoxastrobin, fluxapyroxade, kresoxim-methyl, orysastrobin, picoxystrobin, pyraclostrobin, trifloxystrobin, bixafen, boscalid, sedaxane, fenhexamid, metalaxyl, isopyrazam, mefenoxam, ofurace, dimethomorph, flumorph, fluopicolid (picobenzamid), zoxamide, carpropamid, mandipropamid, fluazinam, cyprodinil, fenarimol, mepanipyrim, pyrimethanil, triforine, fludioxonil, dodemorph, fenpropimorph, tridemorph, fenpropidin, iprodione, vinclozolin, famoxadone, fenamidone, probenazole, proquinazid, acibenzolar-S-methyl, captafol, folpet, fenoxanil, quinoxyfen, 5-ethyl-6-octyl-[1,2,4]triazolo[1,5-a]pyrimidine-7-ylamine, mancozeb, metiram, propineb, thiram, iprovalicarb, flubenthiavalicarb (benthiavalicarb), propamocarb, dithianon, fentin salts, fosetyl, fosetyl-aluminium, $H_3PO_3$ and salts thereof, chlorthalonil, dichlofluanid, thiophanat-methyl, copper acetate, copper hydroxide, copper oxychloride, copper sulfate, sulfur, cymoxanil, metrafenone, spiroxamine and *Bacillus subtilis* and its metabolites.

24. The method as claimed in claim 19, where the at least one fungicide is selected from the group consisting of azoxystrobin, dimoxystrobin, fluoxastrobin, fluxapyroxade, kresoxim-methyl, orysastrobin, picoxystrobin, pyraclostrobin, trifloxystrobin and *Bacillus subtilis* and its metabolites.

25. The method as claimed in claim 1, where the at least one insecticide optionally used in steps (iii), (vi), (viii), (ix) or (x) is selected from
  a) pyrethroid compounds selected from the group consisting of acrinathrin, allethrin, d-cis-trans allethrin, d-trans allethrin, bifenthrin, bioallethrin, bioallethrin S-cylclopentenyl, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin, deltamethrin, empenthrin, esfenvalerate, etofenprox, fenpropathrin, fenvalerate, flucythrinate, flumethrin, tau-fluvalinate, halfenprox, imiprothrin, metofluthrin, permethrin, phenothrin, prallethrin, profluthrin, pyrethrin (pyrethrum), resmethrin, silafluofen, tefluthrin, tetramethrin, tralomethrin and transfluthrin;
  b) nicotinic receptor agonists/antagonists compounds selected from the group consisting of acetamiprid, bensultap, cartap hydrochloride, clothianidin, dinotefuran, imidacloprid, thiamethoxam, nitenpyram, nicotine, spinosad (allosteric agonist), spinetoram (allosteric agonist), thiacloprid, thiocyclam, thiosultap-sodium and AKD1022;
  c) GABA gated chloride channel antagonist compounds selected from
    the group consisting of acetoprole, endosulfan, vaniliprole, pyrafluprole, pyriprole, the phenylpyrazole compound of the formula II

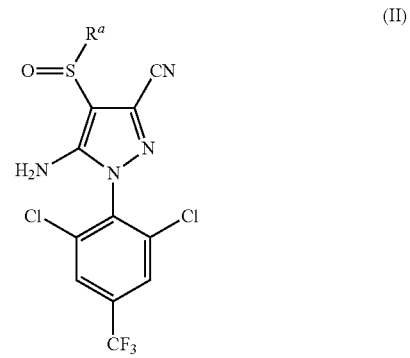

where $R^a$ is $C_1$-$C_4$-alkyl or $C_1$-$C_4$-haloalkyl;
or an agriculturally acceptable salt thereof;
and the phenylpyrazole compound of the formula III

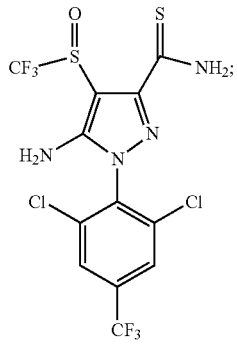

(III)

d) chloride channel activators selected from the group consisting of abamectin, emamectin benzoate, ivermectin, milbemectin and lepimectin; and
e) inhibitors of chitin biosynthesis:
   e1) benzoyl ureas selected from the group consisting of bistrifluron, chlorfluazuron, diflubenzuron, flucycloxuron, flufenoxuron, hexaflumuron, lufenuron, novaluron, noviflumuron, teflubenzuron, and triflumuron.

26. The method as claimed in claim 25, where the at least one insecticide is selected from the group consisting of fipronil, acetamiprid, chlothianidin, imidacloprid, thiamethoxam, teflubenzuron and abamectin.

27. The method as claimed in claim 1, where the at least one nematicide is selected from the group consisting of
antibiotic nematicides;
botanical nematicides;
extracts of *Quillaja* or *Gleditsia;*
saponines;
carbamate nematicides selected from the group consisting of benomyl, carbofuran, carbosulfan and cloethocarb;
oxime carbamate nematicides selected from the group consisting of alanycarb, aldicarb, aldoxycarb, oxamyl and tirpate;
fumigant nematicides selected from dithioether and methyl bromide;
organophosphorus nematicides:
   organophosphate nematicides selected from the group consisting of diamidafos; fenamiphos; fosthietan and phosphamidon;
   organothiophosphate nematicides selected from the group consisting of cadusafos, chlorpyrifos, dichlofenthion, dimethoate, ethoprophos, fensulfothion, fosthiazate, heterophos, isamidofos, isazofos, phorate, phosphocarb, terbufos, thionazin and triazophos;
   phosphonothioate nematicides selected from the group consisting of imicyafos and mecarphon; and
unclassified nematicides selected from the group consisting of acetoprole, benclothiaz, chloropicrin, dazomet, DBCP, DCIP, 1,2-dichloropropane, 1,3-dichloropropene, fluensulfone, furfural, metam, methyl iodide, methyl isothiocyanate and xylenols.

28. The method as claimed in claim 1, where the growth-promoting bacteria are selected from the group consisting of bacteria of the genera *azospirillum, azotobacter, azomonas, bacillus, beijerinckia, burkholderia, clostridium, cyanobacteria, enterobacter, erwinia, gluconobacter, klebsiella* and *streptomyces.*

29. The method as claimed in claim 21, where the growth-promoting bacteria are selected from the group consisting of *Azospirillum amazonense, Herbaspirillum seropedicae, Herbaspirillum rubrisubalbicans, Burkholderia tropica, Gluconacetobacter diazotrophicus, Pseudomonas fluorescens, Pseudomonas putida, Streptomyces griseus, Streptomyces ochraceisleroticus, Streptomyces graminofaciens, Streptomyces corchousii, Streptomyces spiroverticillatus, Streptomyces griseovirdis, Streptomyces hygroscopicus, Bacillus subtilis, Bacillus cereus, Bacillus mycoides, Bacillus pumilus, Bacillus licheniformis* and *Bacillus thuringensis.*

30. The method as claimed in claim 29, where the at least one growth regulator is selected from the group consisting of acylcyclohexanediones, mepiquat chloride and chlormequatchloride.

31. The method as claimed in claim 1, where the at least one rooting enabler is selected from the group consisting of strobilurin fungicides, nicotinic receptor agonists/antagonists, auxins, gibberellins, gibberellic acid, cytokinins, humic acids, extracts of *Quillaja* or *Gleditsia*, saponines, biological control agents and plant defence induction agents.

* * * * *